(12) United States Patent
Gandolfi

(10) Patent No.: US 8,659,857 B2
(45) Date of Patent: Feb. 25, 2014

(54) LEAKAGE CURRENT DETECTION AND INTERRUPTION CIRCUIT POWERED BY LEAKAGE CURRENT

(75) Inventor: Paul R. Gandolfi, Dade City, FL (US)

(73) Assignee: Technology Reasearch Corporation, Clearwater, FL (US)

( * ) Notice: Subject to any disclaimer, the term of this patent is extended or adjusted under 35 U.S.C. 154(b) by 951 days.

(21) Appl. No.: 12/460,695

(22) Filed: Jul. 23, 2009

(65) Prior Publication Data
US 2010/0020452 A1    Jan. 28, 2010

Related U.S. Application Data

(60) Provisional application No. 61/135,989, filed on Jul. 24, 2008.

(51) Int. Cl.
*H02H 3/00* (2006.01)
(52) U.S. Cl.
USPC .......................................................... 361/42
(58) Field of Classification Search
None
See application file for complete search history.

(56) References Cited

U.S. PATENT DOCUMENTS

| | | |
|---|---|---|
| 3,590,325 A | 6/1971 | McMillen |
| 3,619,668 A | 11/1971 | McQueen et al. |
| 3,657,603 A | 4/1972 | Adams |
| 3,719,859 A | 3/1973 | Frantz et al. |
| 3,784,846 A | 1/1974 | Krick et al. |
| 3,814,991 A | 6/1974 | Hewitt |
| 3,950,675 A | 4/1976 | Weber et al. |
| 3,996,496 A | 12/1976 | Volk, Jr. |
| 4,038,061 A | 7/1977 | Anderson et al. |
| 4,122,413 A | 10/1978 | Chen |
| 4,131,927 A | 12/1978 | Tsuchiya et al. |
| 4,205,358 A | 5/1980 | Washington |
| 4,281,358 A | 7/1981 | Plouffe et al. |
| 4,352,998 A | 10/1982 | Baker et al. |
| 4,415,943 A | 11/1983 | Wortman |
| 4,424,544 A | 1/1984 | Chang et al. |
| 4,502,287 A | 3/1985 | Hare et al. |
| 4,543,527 A | 9/1985 | Shuchmann et al. |
| 4,554,463 A | 11/1985 | Norbeck et al. |
| 4,580,186 A | 4/1986 | Parker et al. |
| 4,584,623 A | 4/1986 | Bello et al. |
| 4,717,841 A | 1/1988 | Dumortier et al. |
| 4,858,056 A | 8/1989 | Russell |
| 4,912,589 A * | 3/1990 | Stolarczyk ...................... 361/56 |
| 4,931,894 A | 6/1990 | Legatti |
| 4,947,278 A | 8/1990 | Nichols, III |
| 4,979,090 A | 12/1990 | Bodkin |
| 5,065,104 A | 11/1991 | Kusko |
| 5,142,428 A | 8/1992 | Takeda |
| 5,229,730 A | 7/1993 | Legatti et al. |

(Continued)

*Primary Examiner* — Jared Fureman
*Assistant Examiner* — Terrence Willoughby
(74) *Attorney, Agent, or Firm* — Frijouf Rust & Pyle P.A

(57) ABSTRACT

A circuit is disclosed for disconnecting a power source upon the detection of a leakage current from one of a first and a second wire connected to the power source. A sensing conductor is located adjacent to one of the first and second wires for sensing a leakage current from one of the first and second wires. A disconnect switch is interposed within the first and second wires connected to the power source. A disconnect switch control circuit is connected to the sensing conductor for opening the disconnect switch upon the presence of a leakage current from the sensing conductor. The disconnect switch control circuit operates solely from the leakage current from the sensing conductor.

21 Claims, 19 Drawing Sheets

(56) References Cited

U.S. PATENT DOCUMENTS

| | | |
|---|---|---|
| 5,237,480 A | 8/1993 | Dara |
| 5,262,691 A | 11/1993 | Bailey et al. |
| 5,365,394 A | 11/1994 | Ibarguengoitia |
| 5,418,678 A | 5/1995 | McDonald |
| 5,455,469 A | 10/1995 | Ward |
| 5,459,336 A | 10/1995 | Kato |
| 5,463,521 A | 10/1995 | Love |
| 5,528,445 A | 6/1996 | Cooke et al. |
| 5,600,524 A | 2/1997 | Neiger et al. |
| 5,661,623 A | 8/1997 | McDonald et al. |
| 5,774,316 A | 6/1998 | McGary et al. |
| 5,847,913 A | 12/1998 | Turner et al. |
| 5,889,643 A | 3/1999 | Elms |
| 6,002,563 A | 12/1999 | Esakoff et al. |
| 6,014,297 A | 1/2000 | Clarey et al. |
| 6,057,996 A | 5/2000 | Kim |
| 6,091,591 A | 7/2000 | Heinz et al. |
| 6,111,732 A | 8/2000 | Beland |
| 6,111,733 A | 8/2000 | Neiger et al. |
| 6,218,647 B1 | 4/2001 | Jones |
| 6,252,365 B1 | 6/2001 | Morris et al. |
| 6,262,871 B1 | 7/2001 | Nemir et al. |
| 6,292,337 B1 | 9/2001 | Legatti et al. |
| 6,381,113 B1 | 4/2002 | Legatti |
| 6,404,265 B1 | 6/2002 | Guido, Jr. et al. |
| 6,414,829 B1 | 7/2002 | Haun et al. |
| 6,504,691 B1 | 1/2003 | Matsui et al. |
| 6,525,914 B1 | 2/2003 | Legatti |
| 6,697,237 B2 * | 2/2004 | Duve ............................... 361/42 |
| 6,697,238 B2 | 2/2004 | Bonilla et al. |
| 6,807,036 B2 | 10/2004 | Baldwin |
| 6,829,123 B2 | 12/2004 | Legatti et al. |
| 6,850,394 B2 | 2/2005 | Kim |
| 2002/0145838 A1 | 10/2002 | Bonilla et al. |
| 2003/0202310 A1 | 10/2003 | Field et al. |
| 2004/0037018 A1 | 2/2004 | Kim |
| 2004/0070895 A1 | 4/2004 | Gershen et al. |
| 2004/0070899 A1 | 4/2004 | Gershen et al. |
| 2005/0243485 A1 * | 11/2005 | Gershen et al. ................. 361/42 |

* cited by examiner

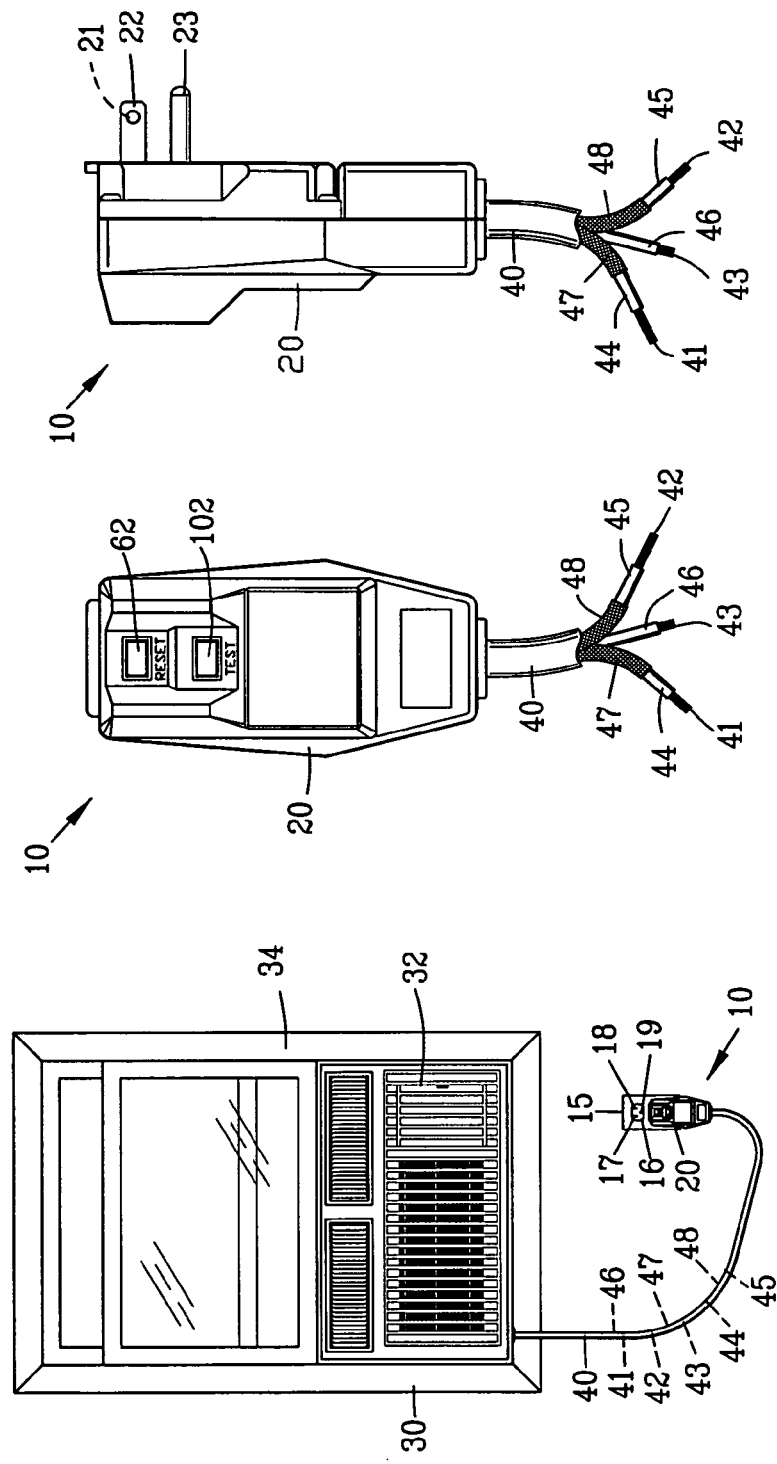

LEAKAGE CURRENT DETECTION AND INTERRUPTION CIRCUIT POWERED BY LEAKAGE CURRENT

CROSS-REFERENCE TO RELATED APPLICATIONS

This application claims benefit of U.S. Patent Provisional application No. 61/135,989 filed Jul. 24, 2008. All subject matter set forth in provisional application 61/135,989 filed Jul. 24, 2008 is hereby incorporated by reference into the present application as if fully set forth herein.

BACKGROUND OF THE INVENTION

1. Field of the Invention

This invention relates to electrical power circuits and more particularly to a circuit for disconnecting a power source upon the detection of a leakage current.

2. Description of the Related Art

Various types of electrical protective devices have been proposed by the prior art for reducing the possibility of dangerous electrical shocks as well as the possibility of electrical fires. One general class of prior art electrical protective devices is a commonly referred to as a ground fault circuit interrupter (GFCI). A ground fault circuit interrupter disconnects a power source upon the detection of an undesired grounding of a power line, such as by a person inadvertently being connected between the power line and a ground. Other types of types of electrical protective devices include appliance leakage current interrupters (ALCIs), equipment leakage current interrupters (ELCIs) and immersion detection circuit interrupters (IDCIs). Underwriters Laboratories, Inc. classifies electrical protective devices as Leakage Current Protection Devices, in Reference Standard UL943A. The following United States patents are representative of leakage current protection devices of the prior art.

U.S. Pat. No. 4,131,927 to Tsuchiya, et al. discloses a current surge, normally associated with the initial application of a nominal A.C. current to an inductive load, for preventing the magnetic core of the inductive load from being driven into saturation. Initially, the current is half wave rectified and amplitude limited. The amplitude limitation insures that the core will not be driven into saturation. A voltage detector connected across the inductive load senses only the counter E.M.F. of a polarity opposite to the polarity of the half wave current. When the sensed voltage reaches a predetermined value, a direct connection is provided between the A.C. supply and the inductive load, bypassing the half wave rectifier and the amplitude limiter.

U.S. Pat. No. 4,352,998 to Baker, et al. discloses a common mode rejection coupler in a power switching system having a variable common mode voltage including a first optical isolator circuit for receiving an input signal and generating in response thereto a first signal which is normally isolated with respect to the common mode voltage. A second optical isolator circuit receives the complement of the input signal and generates a second signal which is also normally isolated with respect to the common mode voltage. The first and second signals are the complement of one another. A comparator receives the first and second signals and generates an output signal which changes state only when the first and second signals complement states. Feedback control circuitry for the comparator is provided for limiting transient changes in one of the first and second signals to prevent the comparator from changing output states when a transient change occurs in one of the first and second signals resulting from a change in the common mode voltage.

U.S. Pat. No. 4,424,544 to Chang, et al. discloses an optically toggled bidirectional normally-on switch with protection against bilateral voltage and bidirectional current surges by the inclusion of a pair of oppositely poled thyristors. One version uses a large junction-type field-effect transistor in its main path and a pair of smaller junction-type transistors in the subsidiary path. A photodiode array controls the gate voltage on each of the transistors and turns them off when illuminated. A control node in the subsidiary path is connected to the gates of the SCRs so that excess current in this path turns on the appropriately-poled thyristor to provide an additional shunt path for the current.

U.S. Pat. No. 4,554,463 to Norbeck, et al. discloses a trigger circuit for gating on a semiconductor switch. The power is minimized by employing A constant current source to provide the gate trigger current. This assures adequate triggering regardless of supply voltage variations or switch intrinsic control voltage requirements. Power is saved by supplying only the current required to drive the semiconductor switch on thereby preventing overdrive. With constant d-c gate current, the precise amount of power needed to turn on and close the switch is provided while wasting relatively little energy due to gate intrinsic voltage variations of the switch or to input line voltage variations.

U.S. Pat. No. 4,717,841 to Dumortier, et al. discloses a static power switch circuit having a power switch member. The static power switch has a bidirectional power switch with at least one controlled semiconductor of the thyristor or triac type with power terminals connected to an AC source in series with a load and a circuit for controlling the power switch member having a first control switch whose current path is connected to the gate of the power semiconductor through a full wave rectifier bridge. This switch is connected to a circuit able to generate control energy of the switch in response to an input signal.

U.S. Pat. No. 5,262,691 to Bailey, et al. discloses an apparatus for responding to a shorted gate in a gate turnoff thyristor. The gate electrode of which is connected by means of a controllable switch to a control voltage terminal having a negative potential with respect to the cathode potential of the thyristor. The controllable switch is arranged to conduct negative gate current in response to a thyristor turnoff command. A voltage comparing means is coupled to the controllable switch for detecting when the switch is conducting negative gate current of relatively high magnitude. Timing means is active for a predetermined interval following the start of the thyristor turnoff command, and logic means is operative to cause the switch to stop conducting negative gate current if the voltage comparing means detects high gate current at the end of such interval.

U.S. Pat. No. 5,365,394 to Ibarguengoitia discloses a protective electronic relay of the type that includes a feed source with a one-phase transformer, rectifying bridge, filter condenser and voltage regulator. Pickups are provided where one-phase signals are generated, connected to some diodes, connected to some capacitors and to a zener diode for the purpose of obtaining rectified, filtered and limited signals with a voltage level proportional to the line intensity of the protected motor. A multiple microswitch connected to some resistors permits presetting of the voltage level and nominal triggering intensity of a relay. An R-C network that can be timed in various scales comprised of resistors a capacitor and another multiple microswitch allows adjustment of the triggering time constant and is applied to that voltage level at the non-inverting input of an operational amplifier whose inverting input is at a reference voltage. Upon the non-inverting input of the operational amplifier reaching the reference voltage, due to a symmetric overload, the output of the operational amplifier passes to logic state 1. This sends a positive signal to the gate of a thyristor, driving it into conduction and depolarizing the base of a transistor making it pass from saturation to cut-off. As a result a relay connected to the collector of the transistor is triggered, changing the state of its contacts and causing disconnection of the protected motor.

U.S. Pat. No. 5,418,678 to McDonald discloses an improved ground fault circuit interrupter (GFCI) device requiring manual setting following initial connection to an AC power source or termination of a power source interruption. The improved GFCI device utilizes a controlled switching device which is responsive to a load power signal for allowing the relay contact sets of the GFCI device to be closed only when power is being made available at the output or load terminals. The controlled switching device preferably comprises an opto-isolator or other type of switching device which provides isolation between the GFCI input and output terminals when the relay contact sets are open. The improved GFCI device may be incorporated into portable units, such as plug-in or line cord units, for use with unprotected AC receptacles.

U.S. Pat. No. 5,459,336 to Kato discloses a semiconductor photocoupler composed of a light emitting element and a light receiving element. Wavelength of emitted light changes as a function of exciting current intensity of the light emitting element, and capacitance of the light receiving element changes as a function of wavelength of receiving light and ceases the capacity change as the receiving light disappears. Signals are transmitted in current-light-capacity type transmission with memory action in the light receiving element.

U.S. Pat. No. 5,463,521 to Love discloses an apparatus for protecting electronic circuit elements from hazardous voltages. The apparatus includes a source of electrical energy that produces electrical energy having a predetermined energy level. An electrical load is connected to the electrical energy source and responsively receives electrical energy. A signaling device receives electrical energy from the electrical energy source and produces an overvoltage signal in response to receiving electrical energy greater than the predetermined energy level. A NMOSFET is connected to the electrical load, and controllably regulates the electrical current flowing through the electrical load. A control device receives the overvoltage signal and responsively controls the operation of the NMOSFET.

U.S. Pat. No. 5,528,445 to Cooke, et al. discloses a fault current protection system for a traction vehicle propulsion system including a synchronous generator having armature and field windings and power conditioning circuitry connecting the generator armature windings to a traction motor employing a normally charged capacitor which, in response to a fault signal resulting from excess current in the generator armature windings, is electrically switched into parallel with the excitation current source connected to the generator field windings so as to discharge through the generator field windings and commutate the excitation current source.

U.S. Pat. No. 5,661,623 to McDonald, et al. discloses a ground fault circuit interrupter (GFCI) line cord plug utilizing an electronically latched relay, rather than a circuit breaker or other type of mechanical latching device, to interrupt the AC load power when a ground fault condition occurs. In order to reduce the size of the relay and minimize the cost and complexity of the GFCI plug, the fixed and movable relay contact structures are mounted directly to the circuit board which carries the remaining components of the GFCI circuit. In a preferred embodiment, the fixed relay contact structures are integral with the plug blades of the GFCI plug. The movable relay contact structures preferably comprise deflectable spring arms which are preloaded when the relay contacts are in the open position in order to control the contact gap, and which are deflected past the point of contact closure when the relay contacts are in the closed position in order to increase the closing force. The principal electrical components of the GFCI plug, including the relay contacts, relay coil and sensing transformer, are mounted on the circuit board in a generally tandem or in-line arrangement in order to minimize the dimensions of the plug.

U.S. Pat. No. 6,002,563 to Esakoff, et al. discloses an improved plug-in power module for providing a controlled amount of electrical power to one or more remote lighting fixtures or other load. The module is configured to sense a ground fault or other current imbalance at the load and, in response, both to trigger the module's circuit breaker to open and to report the occurrence of such a ground fault to a central location. The power module achieves these important functions without adding unduly to the module's complexity or size.

U.S. Pat. No. 6,218,647 to Jones discloses an ice and snow melting system including at least one sensor configured for sensing a temperature or moisture associated with an ambient environment and providing a signal indicative thereof. A heater for melting the ice and snow includes a heater wire, a layer of insulation substantially surrounding the heater wire, and a conductive shield substantially surrounding the layer of insulation. A ground fault circuit interrupter is coupled with the shield of the heater. The ground fault circuit interrupter detects a ground fault condition between the heater wire and the conductive shield and provides a signal indicative thereof. An automatic controller is connected to the at least one sensor. The controller includes heater control circuitry receiving each of the sensor signal and the ground fault circuit interrupter signal. The heater control circuitry selectively controls operation of the heater dependent upon the sensor signal and the ground fault circuit interrupter signal.

U.S. Pat. No. 6,252,365 to Morris, et al. discloses a combination circuit breaker/motor starter including a circuit breaker trip unit having a microprocessor and at least one removably connectable contactor or other functional module. The functional module is encoded with an identifier, such that the microprocessor can determine the type of functional module and appropriate configuration parameters, such as trip times, for the particular application of the functional module. Power is supplied continuously to the trip unit during motor overload or short circuit conditions.

U.S. Pat. No. 6,404,265 to Guido, Jr., et al. discloses a trigger circuit for triggering a silicon device having a control terminal, where the silicon device is subject to variations in the intrinsic control requirements. The trigger circuit comprises a source of direct current (DC) supply voltage, and a DC-to-DC current mode Buck converter for converting the supply voltage into an output DC current not subject to undesired variations due to variations in the supply voltage, the Buck converter supplying to the control terminal a minimum current to turn on the silicon device despite the variations in the intrinsic control requirements. The silicon device may comprise a silicon controlled rectifier (SCR) with a gate terminal, an anode terminal, and a cathode terminal, and wherein the control terminal is the gate terminal, and wherein the variations in the intrinsic control requirements are variations in the intrinsic gate-to-cathode control current and voltage requirements.

U.S. Pat. No. 6,414,829 to Haun, et al. discloses a system for producing a simulated ground fault when arcing is present in an electrical circuit. The system includes a sensor which monitors the electrical circuit. An arcing fault detection circuit determines whether an arcing fault is present in response to the sensor and produces a trip signal in response to a determination that an arcing fault is present in the electrical circuit. A ground fault simulator circuit produces a simulated ground fault in response to the trip signal.

U.S. Pat. No. 6,697,238 and U.S. Patent Application 20020145838 to Bonilla, et al. disclose a GFCI that has secondary test switch contacts. In case closing of the primary test switch contacts fails to trip the GFCI, subsequent closing of the secondary test switch contacts results in a short circuit between the AC input terminals of the GFCI. The short circuit blows a fuse disposed on the line side of the GFCI. The blowing of the fuse disables the GFCI and/or provides an indication to the user that the GFCI is defective.

U.S. Patent Publication 20030202310 to George, et al. discloses a method and apparatus for improving the fault protection of a monitor circuit by coupling an input protection circuit to an output section. The input protection circuit may include a fusible device that limits or removes a fault condition present at an input to the input protection circuit. The fusible device may be, for example, a resettable positive temperature coefficient ("PTC") device configured to limit the current passing through it to a predetermined level once it reaches a predetermined temperature. A resistive element may be thermally coupled to the PTC device to assist it reaching the predetermined temperature. The monitor circuit may further be configured to generate a sensory signal in response to a fault condition.

U.S. Patent Publication 20040037018 to Kim discloses a GFCI mis-wiring detector including a set of input terminals for an AC source, and a set of output terminals for an AC load. The set of output terminals are conductively connected to the set of input terminals. A GFCI circuit has one or more switches that selectively interrupt the connection between the set of input terminals and the set of output terminals when a ground fault occurs. A mis-wiring detection circuit causes the one or more switches of the GFCI circuit to open when the AC source is electrically coupled to the set of output terminals for a first time interval, even if there is no imbalance in the current flow. Additionally, a suppression circuit suppresses operation of the mis-wiring detection circuit when the AC source is electrically coupled to the input terminals for a second time interval. The second time interval is less than the first time interval.

U.S. Patent Publication 20040070895 to Gershen, et al. discloses a SCR, which is used to fire a coil. The coil uses the ground conductor and diodes as the return path to fire the coil to interrupt the voltage from the load. A fully shielded cord is used to detect a break in a conductor. An LED indicator in either the plug or the receptacle of the extension cord verifies that protection is available. A test button is provided to test shield continuity and to verify proper circuit operation.

U.S. Patent Publication 20040070899 to Gershen, et al. discloses basic detection and interruption components of an Immersion Detection Circuit Interrupter (IDCI), in combination with the line, neutral and shield conductors of an extension or appliance cord provides a new improved type of detector. A Leakage Current Detector Interrupter (LCDI) interrupts current to a load when current leakage is detected between the line or neutral conductors of the cord and the shield conductor. The new improved LCDI detector provides, either singularly or in combination, the following advantages: prevents the LCDI from being reset should the device become inoperative (reset lockout); provides an indication of the integrity of the shield in the extension or appliance cord; tests the integrity of the shield within the extension or appliance cord, in addition to testing the functionality of the LCDI; interrupts current to the load if an electrical connection is detected between the shield and neutral, or the shield and ground, in addition to the existing detection of leakage current from the phase conductor; allows the LCDI to trip during an open neutral condition by utilizing the ground connection as a return wire for the trip coil; and/or provides immersion detection at the receptacle end of the extension cord in addition to protection from leakage faults.

U.S. Patent Publication 20040190686 to Tidwell, et al. discloses an apparatus to determine whether or not protection circuitry for a span-powered remote digital subscriber loop unit is properly connected to earth ground by the deliberate assertion and detection of a ground fault from a central office line card location. The span-powered remote unit is augmented to place a controllable conduction path in circuit with the span-powered loop and an earth ground pin. If the earth ground pin has been properly connected to earth ground, applying the conductive path will place a ground fault on the span, which is detected by a ground fault detector within the central office line card. If the ground fault detector does not detect a ground fault in response to the application of the conductive path, the line card forwards a negative ground fault event message to a test center, so that a service technician may be dispatched to the remote unit to correct the problem.

U.S. Patent Application Publication US2006/0061924 to Long Zhang discloses a power plug having leakage current protection function. The power plug includes a changeover mechanism for making and breaking electrical connection between the input (line) and output (load) side of the plug, and a control circuit for detecting a leakage current and a short circuit. A reset button and a test button are provided. When the reset button is pressed, a reset shaft operates the changeover mechanism to achieve electrical connection between the input and output sides. When there is a current leakage, a short circuit or other abnormal conditions at the output side of the plug (or the input side of the appliance connected to the plug), the control circuit generates a signal to operate the changeover mechanism to electrically disconnect the input and output sides. The test button can simulate a short circuit to electrically disconnect the input and output sides.

U.S. Patent Publication 2006-0146456 to Williams discloses a circuit for disconnecting a power source upon the detection of a leakage. The circuit comprises a disconnect switch for disconnecting the power source. A primary circuit controls the disconnect switch. A secondary circuit senses a leakage current. An optical switch interconnects the primary circuit and the secondary circuit for opening the disconnect switch upon the secondary circuit sensing a leakage current. The circuit is suitable for use as a leakage current detection and interruption circuit for completely electrically disconnecting and isolating the power source and the primary circuit from the secondary circuit.

U.S. Patent Publication 2007-0159740 to Williams et al. discloses a circuit for disconnecting a power source upon the detection of a leakage current comprising a power cable having an insulated first and a second wire. The power cable has a conductive shield surrounding the first and second wires with a drain wire electrically contacting the conductive shield. A disconnect switch is interposed between the power source and the power cable. A primary circuit controls the disconnect switch. A secondary circuit is connected to the drain wire for sensing a leakage current between the conductive shield and one of the first and second wires. An optical switch interconnects the primary circuit and the secondary circuit for opening the disconnect switch upon the secondary circuit sensing a leakage current.

U.S. Patent Publication 20080094764 to Long Zhang discloses a power plug includes a base, an upper cover attached to the base, a base-side cover adjacent the base and removably attached to the upper cover, an output cord. A leakage current detection and protection circuit detects a leakage current in the output cord. An electrical connection mechanism electrically connects and disconnects an input side and an output of the power plug. The leakage current detection and protection circuit and the electrical connection mechanism are attached to the base and disposed substantially within a space enclosed by the base and the upper cover. A plurality of connecting ends of the circuit extend from the space enclosed by the base and the upper cover into a space enclosed by the base-side cover and the upper cover. Wires of the output cord are connected to the connecting ends, respectively.

Although the aforementioned discloses have contributed to the art, it is an object of the present invention to provide a circuit for disconnecting a power source upon the detection of a leakage current that provides a further significant improvement in the electrical art.

Another object of this invention is to provide a circuit for disconnecting a power source upon the detection of a leakage current that is operated solely by the leakage current.

Another object of this invention is to provide a circuit for disconnecting a power source upon the detection of a leakage current wherein the circuit has essentially no current flow in an absence of any leakage current.

Another object of this invention is to provide a circuit for disconnecting a power source upon the detection of a leakage current that requires a reduced number of electrical components.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention comprises a circuit for disconnecting a power source upon the detection of a leakage current from one of a first and a second wire connected to the power source. The circuit comprises a sensing conductor located adjacent to one of the first and second wires for sensing a leakage current from one of the first and second wires. A disconnect switch is interposed within the first and second wires connected to the power source. A disconnect switch control circuit is connected to the sensing conductor for opening the disconnect switch solely from the leakage current from the sensing conductor.

In another embodiment of the invention, the invention is incorporated into circuit for disconnecting a power source upon the detection of a leakage current from a wire connected to the power source. The circuit comprises a sensing conductor located adjacent to the wire for sensing a leakage current from the wire. A disconnect switch is interposed within the wire connected to the power source. A disconnect switch control circuit comprising a capacitor is connected to said sensing conductor for opening said disconnect switch upon said capacitor accumulating a predetermined amount of the leakage current from the sensing conductor.

In a more specific embodiment of the invention, the disconnect switch control circuit has essentially no current flow in an absence of any leakage current from the sensing conductor. The disconnect switch control circuit operates solely on a leakage current from the sensing conductor in the presence of a leakage current from the sensing conductor and one of the first and second wire.

In another specific embodiment of the invention, the disconnect switch control circuit comprises a threshold voltage switch connected to the disconnect switch. The threshold voltage generator has essentially no current flow in an absence of any leakage current flow between the sensing conductor and one of the first and second wires. The threshold voltage generator generates the threshold voltage for the threshold voltage solely upon a leakage current flow between the sensing conductor and one of the first and second wires and through the threshold voltage generator.

In another example, the invention is incorporated into a circuit for disconnecting a power source upon the detection of a leakage current from one of a first and a second wire connected to the power source. The circuit comprises a sensing conductor located adjacent to one of the first and second wires for sensing a leakage current from one of the first and second wires. A disconnect switch is interposed within the first and second wires connected to the power source. The disconnect switch has a disconnect switch solenoid coil for opening the disconnect switch. A threshold voltage switch is conductive upon a threshold voltage applied to the threshold voltage switch. A connector connects the disconnect switch solenoid coil in series with the threshold voltage switch between one of the first and second wires and the sensing conductor. A threshold voltage generator generates the threshold voltage for actuating the threshold voltage switch upon a leakage current flow between the sensing conductor and one of the first and second wires and through the threshold voltage generator.

In one example of the invention, the sensing conductor comprises a first and a second shield sensing conductor located about the first and second wires. In an alternate example of the invention, the sensing conductor comprises a shield sensing conductor located about both of the first and second wires.

Preferably, the disconnect switch includes a normally open solenoid operated switch. A mechanical latch mechanism maintains the disconnect switch in a closed condition. The disconnect switch solenoid coil operates a solenoid for disengaging the mechanical latch mechanism for opening the disconnect switch.

In one example of the invention, the threshold voltage switch includes a thyristor. The thyristor may comprise a silicon control rectifier (SCR) with a Zener diode connected to a gate of the silicon control rectifier (SCR). In an alternate example of the invention, the threshold voltage switch comprises a diode for alternating current (DIAC). In a further example of the invention, the threshold voltage switch comprises a silicon diode for alternating current (SIDAC).

Preferably, the threshold voltage generator comprises a capacitor connected in series with a diode between the sensing conductor and one of the first and second wires for charging the capacitor upon a leakage current flow between the sensing conductor and one of the first and second wires for generating the threshold voltage.

In a further example of the invention, the invention is incorporated into a circuit for disconnecting a power source upon the detection of a leakage current from one of a first and a second wire connected to the power source. The circuit comprises a sensing conductor located adjacent to one of the first and second wires for sensing a leakage current from one of the first and second wires. A disconnect switch is interposed within the first and second wires connected to the power source. The disconnect switch has a disconnect switch solenoid coil for opening the disconnect switch. A divider circuit is interconnected between the first and second wires for providing a divider node. A threshold voltage switch is conductive upon a threshold voltage applied to the threshold voltage switch. A connector connects the disconnect switch solenoid coil in series with the threshold voltage switch between the divider node and the sensing conductor. A capacitor is connected between the divider node and the sensing conductor to provide the threshold voltage to the threshold voltage switch upon a leakage current flow between the sensing conductor and one of the first and second wires. Preferably, the divider circuit is a voltage node such as a diode node, a resistive node and the like.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is an elevational view of the circuit of the present invention connecting a power source to a load shown as an air conditioning unit;

FIG. 2 is an enlarged view of the a portion of FIG. 1 illustrating an electrical plug housing the circuit of the present invention;

FIG. 3 is a side view of FIG. 2;

Similar reference characters refer to similar parts throughout the several Figures of the drawings.

DETAILED DISCUSSION

Figure 4:
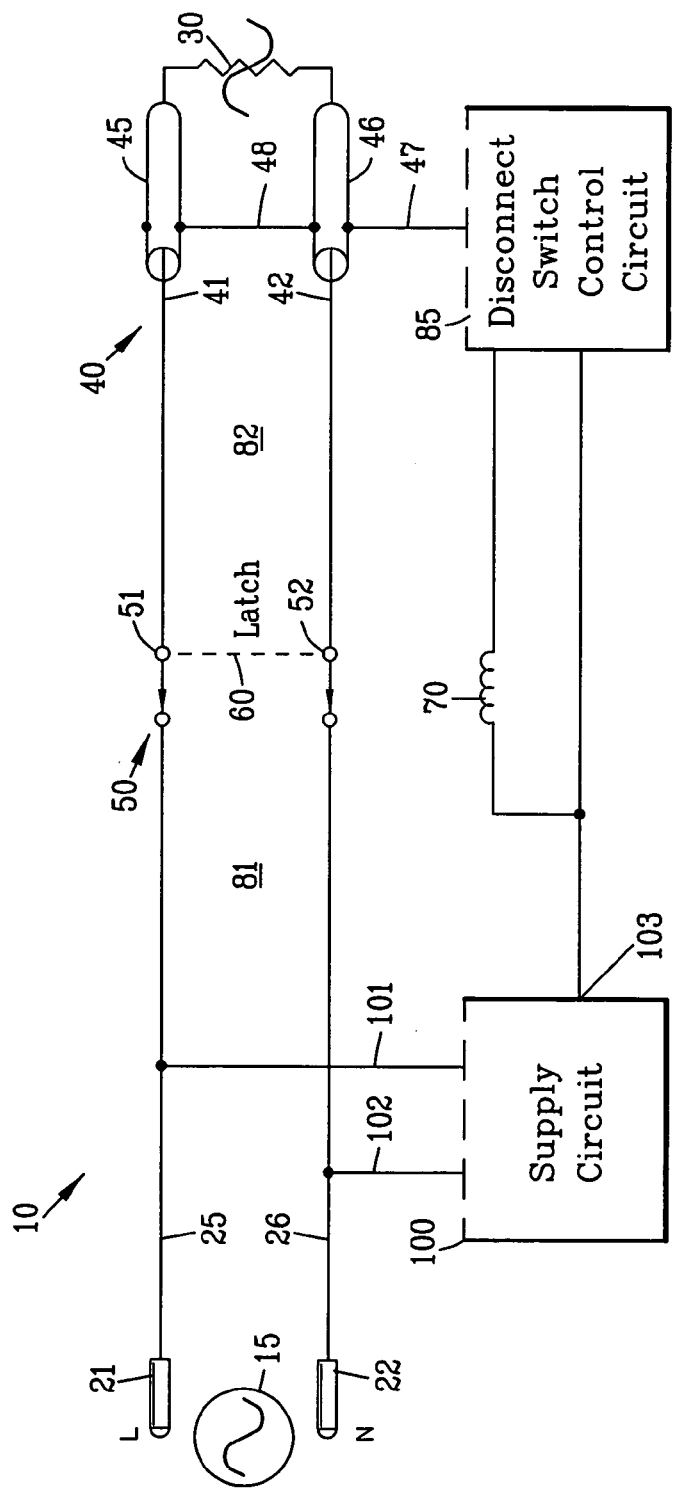
FIG. 4 is a block diagram of a first embodiment of a leakage detection and interruption circuit of the present invention.

FIG. 1 is an elevational view of the circuit 10 of the present invention for disconnecting a power source 15 upon the detection of a leakage current. In this example, the power source 15 is shown as a conventional electrical receptacle 17. The circuit 10 is contained within a housing 20 in the form of an electrical plug adapted for insertion within the conventional electrical receptacle 17. A load 30 is shown as an air conditioning unit 32 installed in a window 34. A wire assembly 40 connects the circuit 10 within the housing 20 to the load 30.

FIGS. 2 and 3 are enlarged views of a portion of FIG. 1 further illustrating the circuit 10 contained within the housing 20. The housing 20 supports conventional a first and a second electrical lug 21 and 22 and a grounding lug 23 for insertion into the conventional electrical receptacle 17. The circuit 10 connects the electrical lugs 21-23 to a first and a second wire 41 and 42 and a grounding wire 43 of the wire assembly 40. A first and a second insulation 44 and 45 surround the first and second wires 41 and 42 whereas insulation 46 surrounds the grounding wire 43 in a conventional fashion.

A first and a second shield 47 and 48 surround the first and second wires 41 and 42. As will be described in greater detail hereinafter, the circuit 10 disconnects the power source 15 from the load 30 upon the detection of a leakage current from any one of the first and second wires 41 and 42 and the first and second shields 47 and 48. In addition, the circuit 10 disconnects the power source 15 from the load 30 upon the detection of a leakage current from the grounding wire 43 to either one of the first and second shields 47 and 48. In the alternative, a conventional non-insulated wire (not shown) may extend along the first and second wires 41 and 42 and the grounding wire 43 as a sensor wire for detecting a leakage current from the either one of the first and second wires 41 and 42 and/or the grounding wire 43.

FIG. 4 is a block diagram of a first embodiment of the present invention illustrating a circuit 10 for disconnecting an electrical power source 15 from the load 30 upon the detection of a leakage current within the wire assembly 40. In this example, the electrical power source 15 is shown as a conventional 120 volt alternating current (AC) power source. The first terminal 21 is the line terminal whereas the second terminal 22 is the neutral terminal. Although the electrical power source 15 has been shown as conventional 120 volt alternating current (AC) power source, it should be appreciated by those skilled in the art that the present invention may be adapted to virtually any type of power source.

The circuit 10 comprises a disconnect switch 50 interposed a first and a second terminal wires 25 and 26 and the first and second wires 41 and 42 for disconnecting the power source 15 from the load 30.

The disconnect switch 50 is shown as a normally open switch having a mechanical latch 60 for retaining the disconnect switch 50 in a closed position. As will be described in greater detail with reference to FIGS. 6-9, a solenoid coil 70 operates to disengage the mechanical latch 60 for opening the disconnect switch 50 to disconnecting the power source 15 from the load 30.

A primary circuit 81 is defined between the electrical power source 15 and the disconnect switch 50. A secondary circuit 82 is defined between the disconnect switch 50 and the load 30.

The first and second shields 45 and 46 function as shield sensing conductors for sensing a leakage current between the one of the first and second wires 41 and 42 and the first and second shields 45 and 46. In the alternative, a single shield surrounding both the first and second wires 41 and 42 may be provided as a sensing conductor as shown in FIG. 5.

A disconnect switch control circuit 85 is connected to the first and second shields 45 and 46 through conductors 47 and 48. In this example, a supply circuit 100 is connected to the first and second terminal wires 25 and 26 by conductors 101 and 102 in the primary circuit 81 defined between the electrical power source 15 and the disconnect switch 50 to provide a node 103. The disconnect switch control circuit 85 is interposed between the first and second shields 45 and 46 and the first and second terminal wires 25 and 26 through the supply circuit 100 for controlling the disconnect switch 50. The disconnect switch control circuit 85 opens the disconnect switch 50 upon a leakage current flow from one of the first and second wires 41 and 42 and the first and second shields 45 and 46.

An important feature of the present invention is the disconnect switch control circuit 85 is powered solely by a leakage current between either of the first and second wires 41 and 42 and the first and second shields 45 and 46. Essentially, no current flows through the disconnect switch control circuit 85 in the absence of any leakage current between either of the first and second wires 41 and 42 and the first and second shields 45 and 46.

Figure 5:
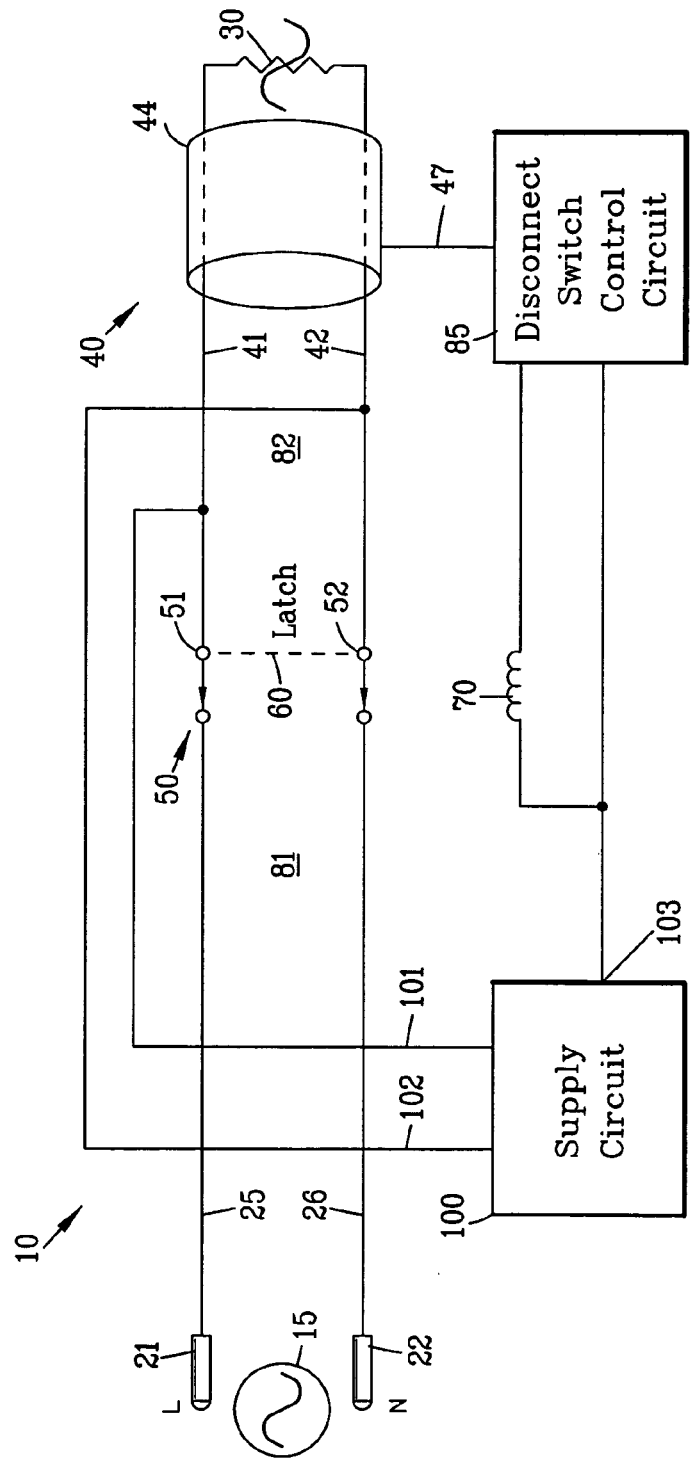
FIG. 5 is a block diagram of a variation of the first embodiment of the leakage detection and interruption circuit of the present invention shown in FIG. 4.

FIG. 5 is a block diagram of a variation of the first embodiment of the leakage detection and interruption circuit 10 of the present invention shown in FIG. 4. The circuit 10 disconnects the electrical power source 15 from the load 30 upon the detection of a leakage current within the wire assembly 40.

In this example, a single shield 44 surrounding both the first and second wires 41 and 42 functions as shield sensing conductors for sensing a leakage current between the one of the first and second wires 41 and 42 and the shield 44. The supply circuit 100 is connected to the first and second wires 41 and 42 through conductors 101 and 102 in the secondary circuit 82 defined between the disconnect switch 50 and the load 30 to provide a node 103.

The disconnect switch control circuit 85 is interposed between the shield 44 and the first and second wires 41 and 42 through the supply circuit 100 for controlling the disconnect switch 50. The disconnect switch control circuit 85 opens the disconnect switch 50 upon a leakage current flow from one of the first and second wires 41 and 42 and the shield 44. The disconnect switch control circuit 85 is powered solely by a leakage current between either of the first and second wires 41 and 42 and the shield 44. Essentially, no current flows through the disconnect switch control circuit 85 in the absence of any leakage current between either of the first and second wires 41 and 42 and the shield 44.

Figure 6:
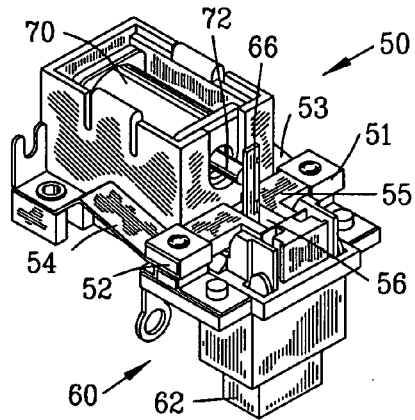
FIG. 6 is an isometric view of a first embodiment of a disconnect switch in a closed position.
Figure 7:
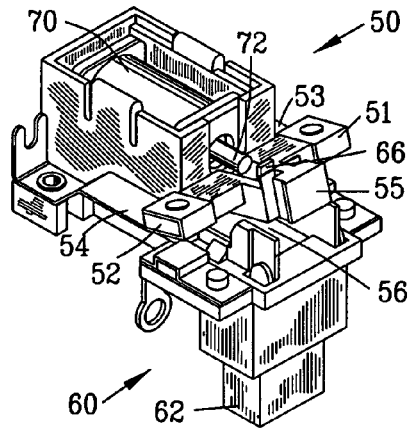
FIG. 7 is an isometric view of the disconnect switch of FIG. 6 in an open position.

FIGS. 6 and 7 are isometric views of an example of the disconnect switch 50 of FIG. 4 shown in a closed and an open position, respectively. In this example, the disconnect switch 50 comprises a first and a second switch 51 and 52 shown as resilient relay contacts 51 and 52 mounted on resilient metallic conductors 53 and 54. The resilient metallic conductors 53 and 54 bias the first and second switches 51 and 52 into an open position.

Figure 8:
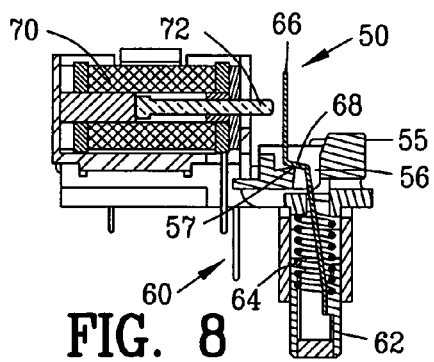
FIG. 8 is a side sectional view of the disconnect switch of FIG. 6 in the closed position.
Figure 9:
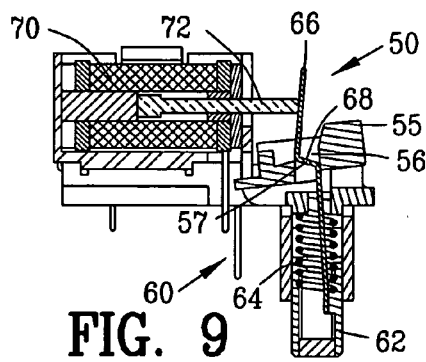
FIG. 9 is a side sectional view of the disconnect switch of FIG. 6 in a the process of transferring to an open position.

FIGS. 8-9 illustrate various positions of the operation of the disconnect switch 50 and the latch 60. An insulating switch operator 55 interconnects the first and second switches 51 and 52 for moving the first and second switches 51 and 52 in unison. The insulating switch operator 55 includes an aperture 56 defining a shoulder 57. The disconnect switch 50 includes a solenoid coil 70 for operating a plunger 72. The plunger 72 is located for movement adjacent to the aperture 56 in the insulating switch operator 55.

In this example, the latch 60 is shown as a mechanical latch comprising a reset button 62 having a return spring 64. The resent button 62 extends from the housing 20 as shown in FIGS. 1 and 2. A latch bar 66 having a latch shoulder 68 is connected to the reset button 62.

Figure 8A:
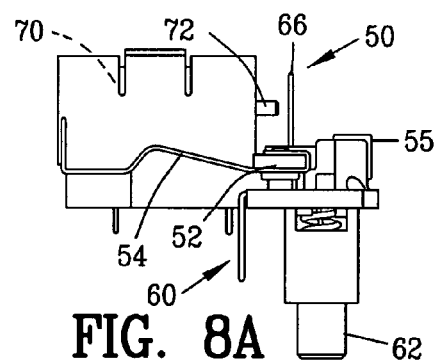
FIG. 8A is a side view of the disconnect switch shown in FIG. 8.

FIGS. 8 and 8A illustrate the disconnect switch 50 of FIG. 5 in the closed position. The latch shoulder 68 of the latch bar 66 engages with the shoulder 57 defined by the aperture of the switch operator 55. The return spring 64 is selected to be stronger than the resilient metallic conductors 53 and 54 biasing the first and second switches 51 and 52 into an open position. The return spring 64 retains the first and second switches 51 and 52 in the closed position against the urging of the resilient metallic conductors 53 and 54.

Figure 9A:
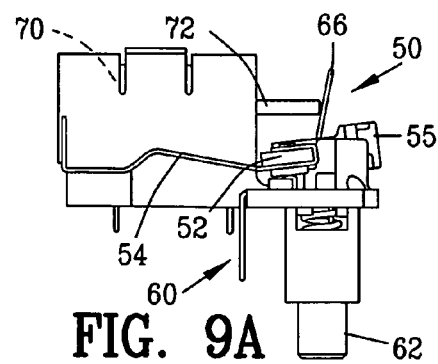
FIG. 9A is a side view of the disconnect switch shown in FIG. 9.

FIGS. 9 and 9A illustrate the disconnect switch 50 in a partially open position. An electrical current through the solenoid coil 70 extends the plunger 72 to displace the latch bar 66. The plunger 72 displaces the latch bar 66 to disengage the latch shoulder 68 of the latch bar 66 from the shoulder 57 of the switch operator 55. The disengagement of the latch shoulder 68 from the shoulder 57 permits the resilient metallic conductors 53 and 54 to bias the first and second switches 51 and 52 into the open position.

The first and second switches 51 and 52 remain in the open position until the disconnect switch 50 is manually reset. The disconnect switch 50 is manually reset by depressing the reset button 62 against the urging of the return spring 64. The latch shoulder 68 of the latch bar 66 reengages with the shoulder 57 of the switch operator 55. The first and second switches 51 and 52 remain in the closed position against the urging of the resilient metallic conductors 53 and 54.

Figure 10:
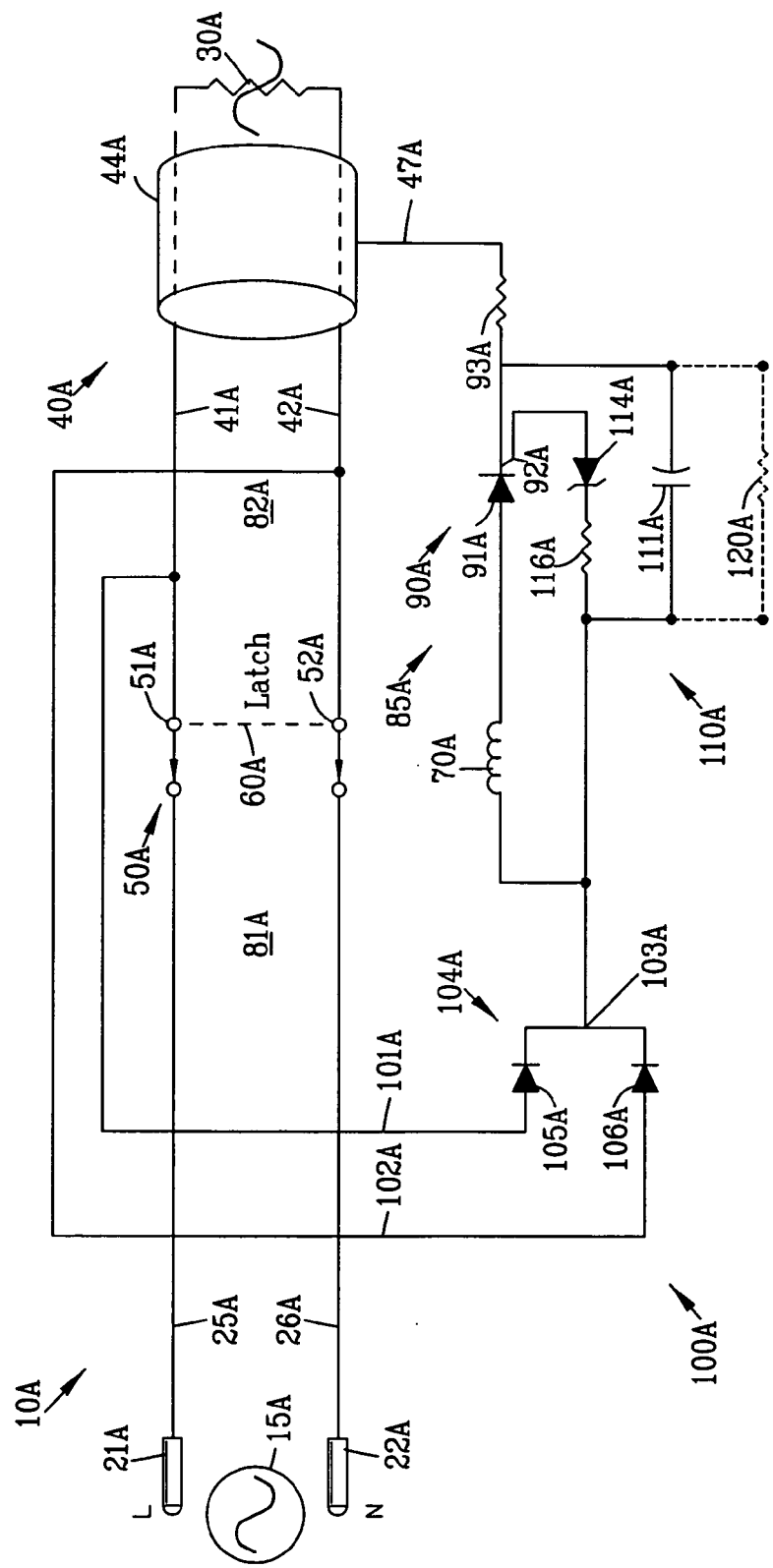
FIG. 10 is a circuit diagram of a second embodiment of a leakage detection and interruption circuit of the present invention.

FIG. 10 is a circuit diagram of a second embodiment of a leakage detection and interruption circuit 10A of the present invention. In this embodiment, similar components are labeled with similar numbers in prior embodiments with a different alphabetical character. A primary circuit 81A is defined between the electrical power source 15A and the disconnect switch 50A whereas a secondary circuit 82A is defined between the disconnect switch 50A and the load 30A.

In this example, a single shield 44A surrounding both the first and second wires 41A and 42A functions as shield sensing conductors for sensing a leakage current between the one of the first and second wires 41A and 42A and the shield 44A.

The supply circuit 100A is connected to the first and second wires 41A and 42A by conductors 101A and 102A in the secondary circuit 82A defined between the disconnect switch 50A and the load 30A to provide a node 103A. The supply circuit 100A is shown as a divider circuit 104A comprising diodes 105A and 106A to provide the node 103A.

The disconnect switch control circuit 85A is interposed between the shield 44A and the node 103A of the divider circuit 104A. In this embodiment, the disconnect switch control circuit 85A is shown as a threshold conduction circuit 90A comprising a threshold conduction device 91A. The threshold conduction device 91A is illustrated as a silicon control rectifier (SCR) having a gate 92A. An optional current limiting resistor 93A is connected in series with the threshold conduction device 91A.

A threshold generating circuit 110A is connected to the threshold conduction device 91A for actuating the threshold conduction device 91A upon a leakage current between the one of the first and second wires 41A and 42A and the shield 44A. The threshold generating circuit 110A comprises a capacitor 111A for generating a voltage upon a leakage current between the one of the first and second wires 41A and 42A and the shield 44A. A zener diode 114A and resistor 116A provide a threshold level for the voltage generated by the capacitor 111A.

In the event a leakage current develops between the first wires 41A and the shield 44A, a leakage current will flow through diode 106A to charge capacitor 111A. When the voltage on capacitor 111A exceeds the breakdown voltage of the zener diode 114A, the zener diode 114A conducts a current through the gate 92A to actuate the threshold conduction device 91A. Upon actuation of the threshold conduction device 91A, the capacitor 111A discharges through the solenoid coil 70A to open the disconnect switch 50A.

In the event a leakage current develops between the second wires 42A and the shield 44A, a leakage current will flow through diode 105A to charge capacitor 111A. When the voltage on capacitor 111A exceeds the breakdown voltage of the Zener diode 114A, the Zener diode 114A conducts a current through the gate 92A to actuate the threshold conduction device 91A. Upon actuation of the threshold conduction device 91A, the capacitor 111A discharges through the solenoid coil 70A to open the disconnect switch 50A.

During a leakage current between either of the first and second wires 41A and 42A and the shield 44A, the leakage current is accumulated and stored in the capacitor 111A until the charge in capacitor 111A is sufficient to provide sufficient current through solenoid coil 70A to open the disconnect switch 50A. The breakdown voltage of zener diode 114A is selected to insure that a sufficient charge is stored in capacitor 111A to open the disconnect switch 50A. In the absence of any leakage current between either of the first and second wires 41A and 42A and the shield 44A, essentially, no current flows to charge capacitor 111A.

An optional resistor 120A may be connected across the capacitor 111A. The optional resistors 120A functions to bleed of any charge developed on capacitor 111A over an extended period of time. Over an extended period of time, a few microamperes of leakage current could possibly charge capacitor 111A and actuate the threshold conduction device 91A. The presence of the optional resistors 120A desensitizes the leakage detection and interruption circuit 10A by diverting some leakage current around the capacitor 111A. Furthermore, the optional resistors 120A help to discharge the capacitor 111A between trip events.

Figure 11:
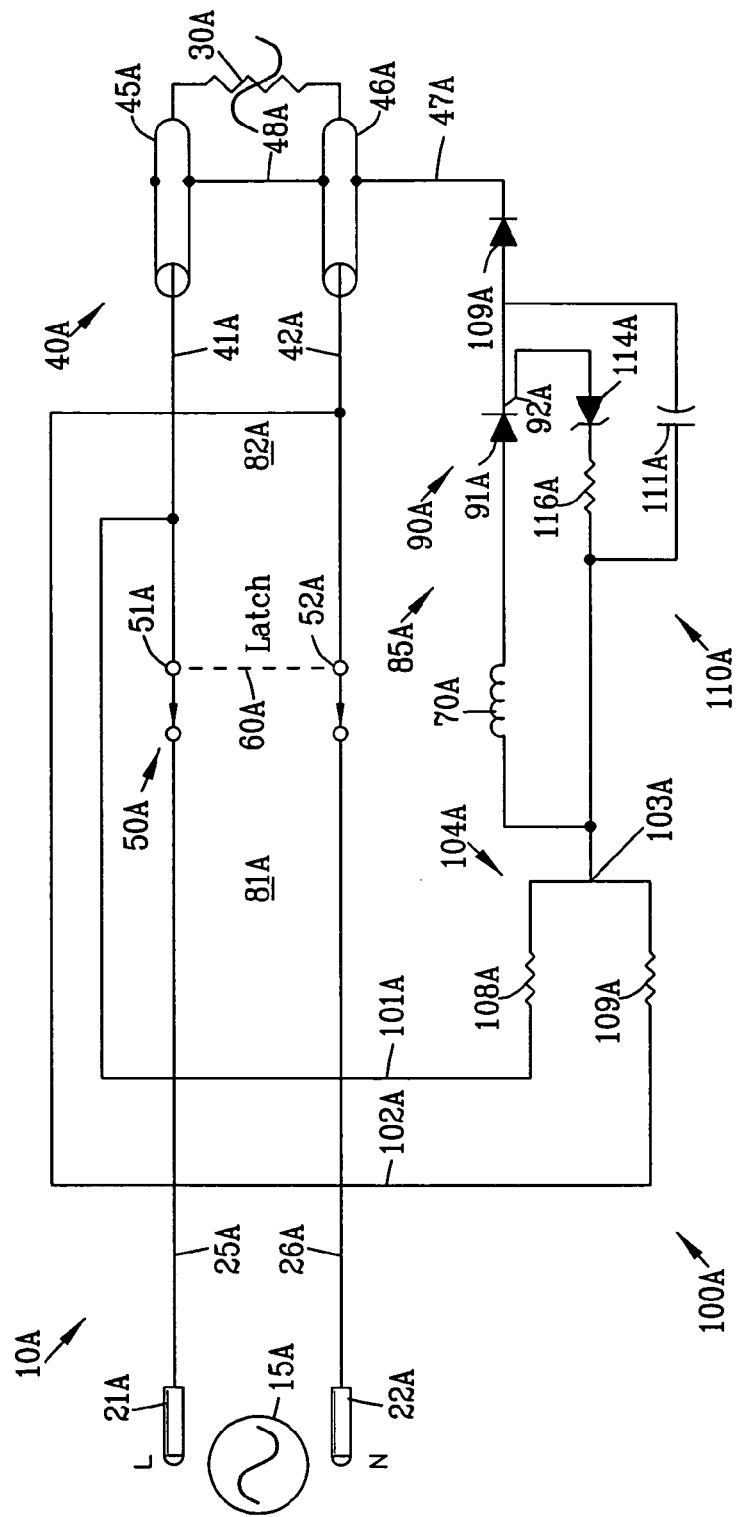
FIG. 11 is a first variation of the circuit diagram shown in FIG. 10.

FIG. 11 is a first variation of the circuit diagram shown in FIG. 10. In this example, In this example, a first and second shield 45A and 46A function as shield sensing conductors for sensing a leakage current between the one of the first and second wires 41A and 42A and the first and second shields 45A and 46A.

The supply circuit 100A is connected to the first and second wires 41A and 42A by conductors 101A and 102A in the secondary circuit 82A. The supply circuit 100A is shown as a voltage divider circuit comprising resistor 108A and 109A to provide a voltage node 103A.

In this embodiment, the disconnect switch control circuit 85A is shown as a threshold conduction circuit 90A comprising a threshold conduction device 91A illustrated as a silicon control rectifier (SCR) having a gate 92A. A diode 109A is connected in series with the threshold conduction device 91A.

A threshold generating circuit 110A is similar to the circuit shown in FIG. 10. The diode 109A is connected in series with the capacitor 111A for enabling the capacitor 111A to accumulate any leakage current between either of the first and second wires 41A and 42A and the first and second shields 45A and 46A.

In the event a leakage current develops between the first wires 41A and the first shield 45A, the leakage current will flow through resistor 109A to charge capacitor 111A. When the voltage on capacitor 111A exceeds the breakdown voltage of the zener diode 114A, the zener diode 114A actuates the threshold conduction device 91A. Upon actuation of the threshold conduction device 91A, the capacitor 111A discharges through the solenoid coil 70A to open the disconnect switch 50A.

In the event a leakage current develops between the second wires 42A and the second shield 46A, a leakage current will flow through resistor 108A to charge capacitor 111A. When the voltage on capacitor 111A exceeds the breakdown voltage of the zener diode 114A, the zener diode 114A actuates the threshold conduction device 91A. Upon actuation of the threshold conduction device 91A, the capacitor 111A discharges through the solenoid coil 70A to open the disconnect switch 50A.

Figure 12:
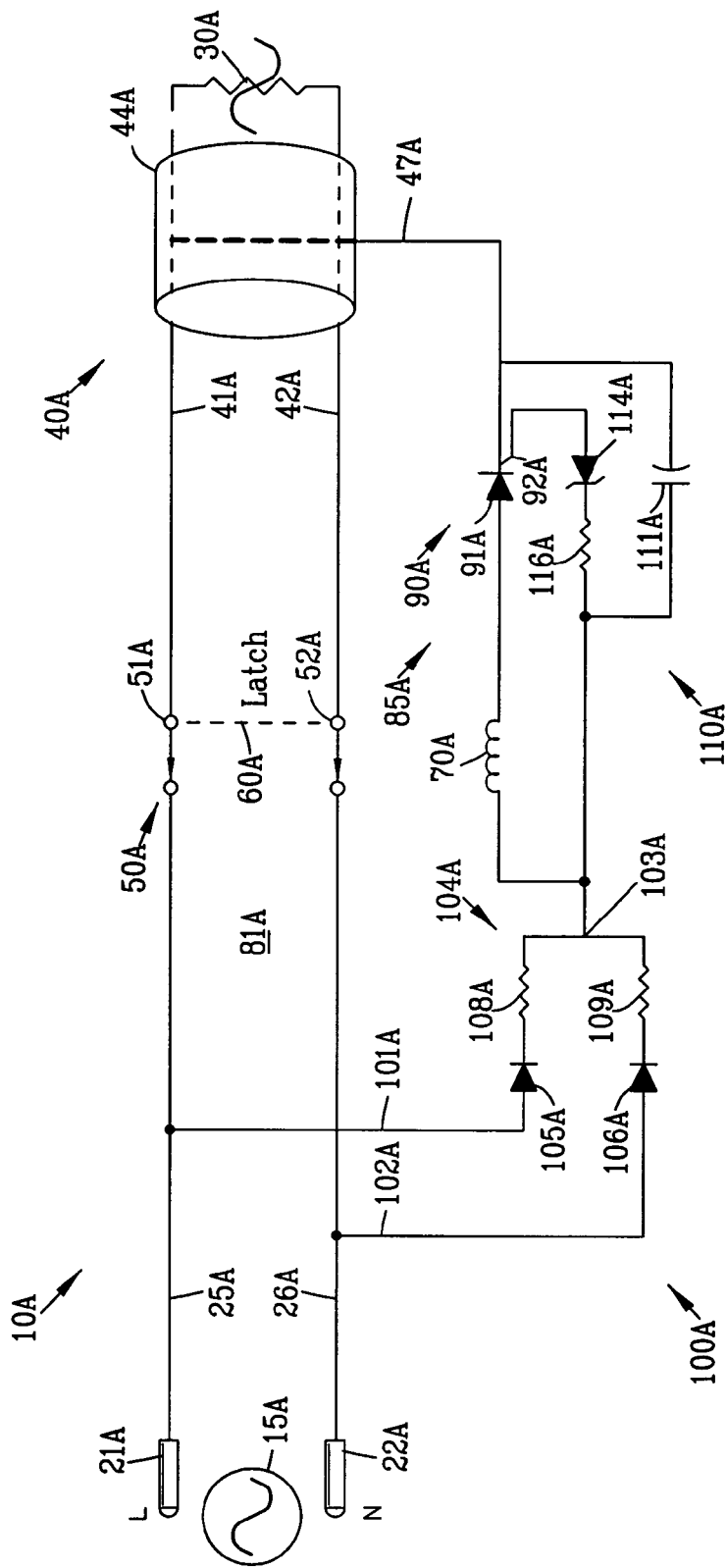
FIG. 12 is a second variation of the circuit diagram shown in FIG. 10.

FIG. 12 is a second variation of the circuit diagram shown in FIG. 10. In this example, a single shield 44A surrounding both the first and second wires 41A and 42A functions as shield sensing conductors for sensing a leakage current between the one of the first and second wires 41A and 42A and the shield 44A.

The supply circuit 100A is connected to the first and second terminal wires 25A and 26A by conductors 101A and 102A in the primary circuit 81A. The supply circuit 100A is shown as a voltage divider circuit comprising diodes 105A and 106A and resistors 108A and 109A to provide the node 103A. The resistors 108A and 109A provide a reduction in voltage to the node 103A as well as eliminating the need for the optional resistor 93A in FIG. 10. The second variation of the circuit diagram in FIG. 12 operates in a manner similar to the operation of the circuit in FIG. 10.

Figure 13:
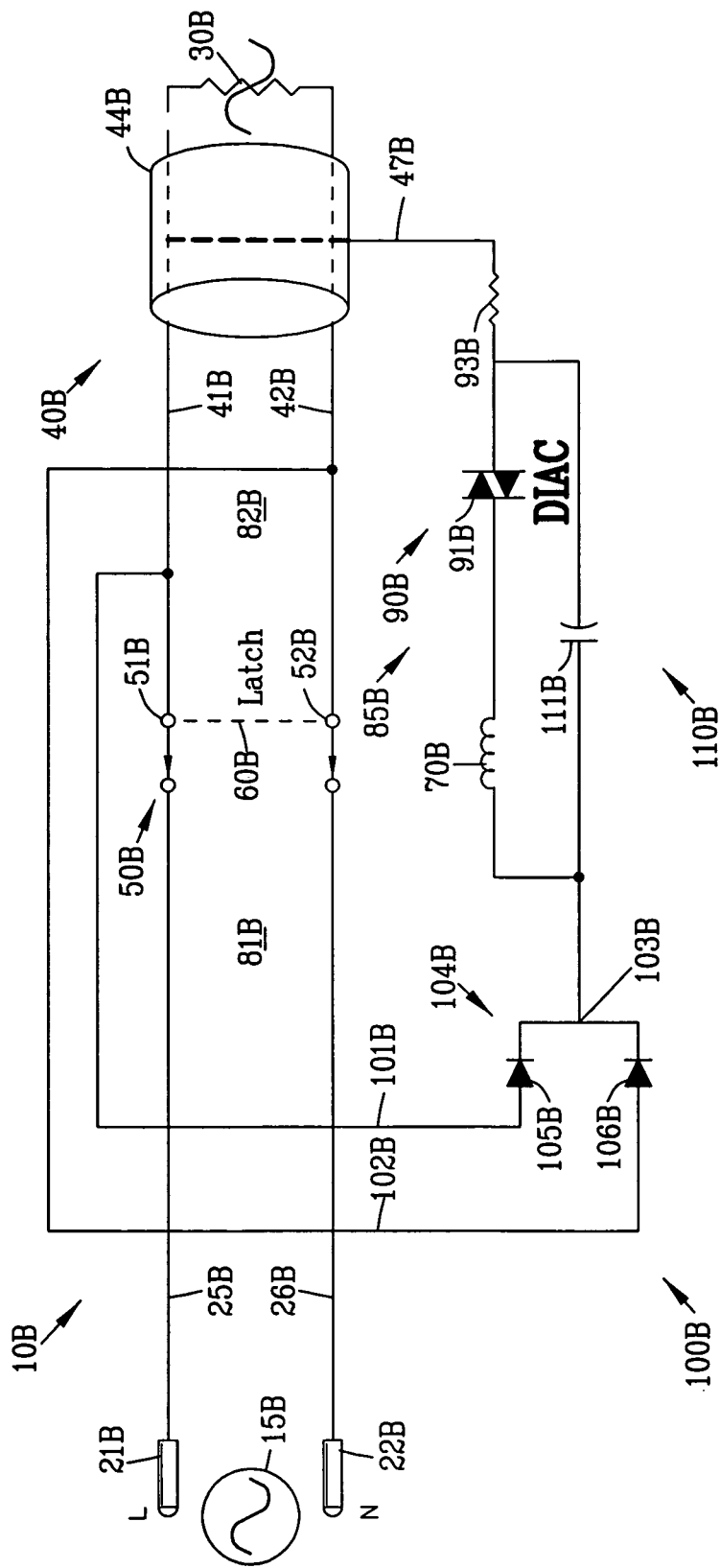
FIG. 13 is a circuit diagram of a third embodiment of a leakage detection and interruption circuit of the present invention.

FIG. 13 is a circuit diagram of a third embodiment of a leakage detection and interruption circuit 10B of the present invention. In this embodiment, similar components are labeled with similar numbers found in prior embodiments with a different alphabetical character.

In this example, a single shield 44B surrounding both the first and second wires 41B and 42B functions as shield sensing conductors for sensing a leakage current between the one of the first and second wires 41B and 42B and the shield 44B.

The supply circuit 100B is connected to the first and second wires 41B and 42B by conductors 101B and 102B in the secondary circuit 82B defined between the disconnect switch 50B and the load 30B to provide a node 103B. The supply circuit 100B is shown as a divider circuit 104B comprising diodes 105B and 106B to provide the node 103B.

The disconnect switch control circuit 85B is interposed between the shield 44B and the node 103B of the divider circuit 104B. In this embodiment, the disconnect switch control circuit 85B is shown as a threshold conduction circuit 90B comprising a threshold conduction device 91B. The threshold conduction device 91B is illustrated as a diode for alternating current (DIAC). The diode for alternating current (DIAC) 91B conducts upon a threshold voltage applied across the diode for alternating current (DIAC) 91B. An optional current limiting resistor 93B is connected in series with the threshold conduction device 91B.

A threshold generating circuit 110B is connected to the threshold conduction device 91B for actuating the threshold conduction device 91B upon a leakage current between the one of the first and second wires 41B and 42B and the shield 44B. The threshold generating circuit 110B comprises a capacitor 111B.

In the event a leakage current develops between the first wires 41B and the shield 44B, a leakage current will flow through diode 106B to charge capacitor 111B. When the voltage on capacitor 111B exceeds the threshold voltage of the diode for alternating current (DIAC) 91B, the diode for alternating current (DIAC) 91B conducts to discharged the capacitor 111B through the solenoid coil 70B to open the disconnect switch 50B.

In the event a leakage current develops between the second wires 42B and the shield 44B, a leakage current will flow through diode 105B to charge capacitor 111B. When the voltage on capacitor 111B exceeds the threshold voltage of the diode for alternating current (DIAC) 91B, the diode for alternating current (DIAC) 91B conducts to discharged the capacitor 111B through the solenoid coil 70B to open the disconnect switch 50B.

During a leakage current between either of the first and second wires 41B and 42B and the shield 44B, the leakage current is accumulated and stored in the capacitor 111B until the charge in capacitor 111B is sufficient to actuate the diode for alternating current (DIAC) 91B and for providing sufficient current through solenoid coil 70B to open the disconnect switch 50B.

Figure 14:
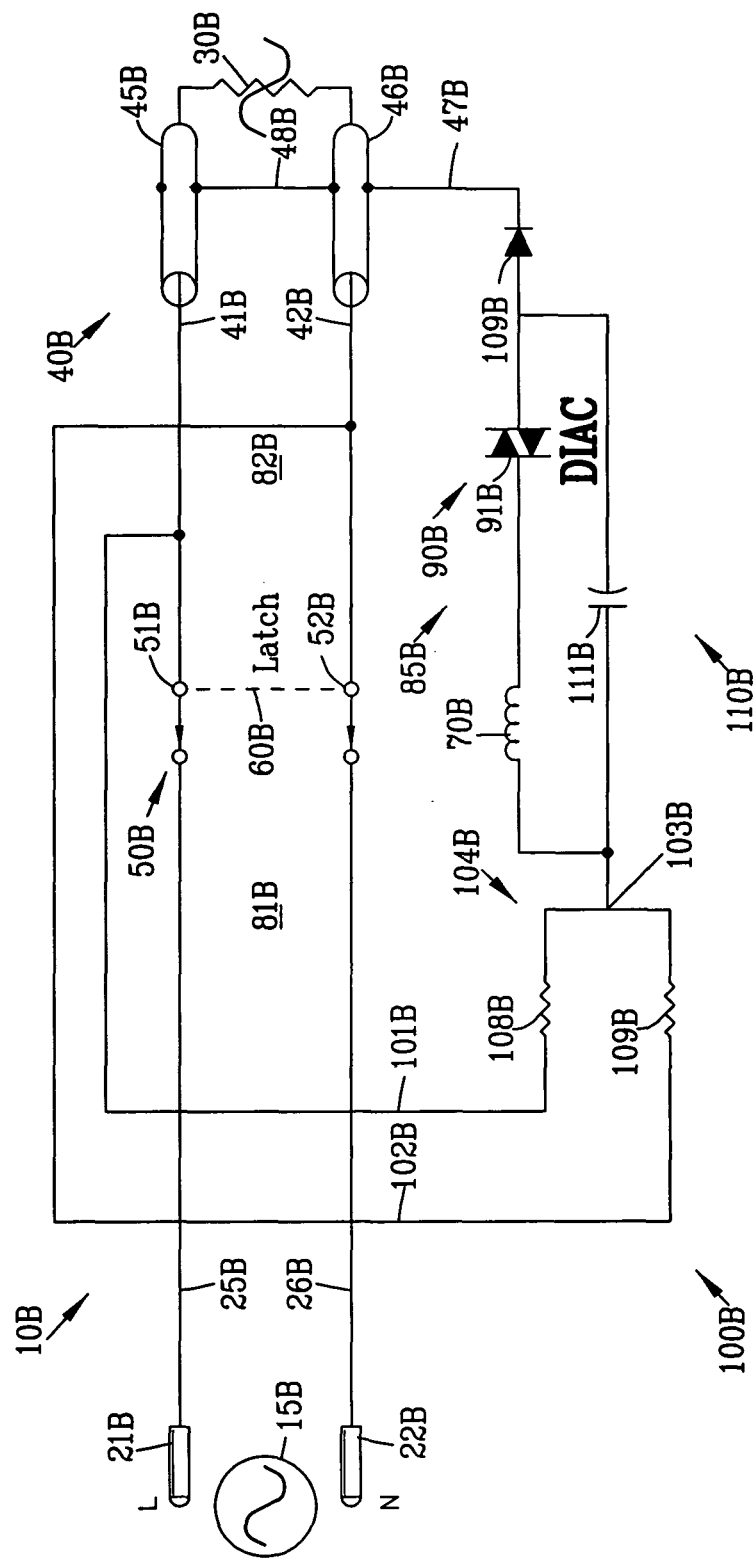
FIG. 14 is a first variation of the circuit diagram shown in FIG. 13.

FIG. 14 is a first variation of the circuit diagram shown in FIG. 13. In this example, a first and second shield 45B and 46B function as shield sensing conductors for sensing a leakage current between the one of the first and second wires 41B and 42B and the first and second shields 45B and 46B.

The supply circuit 100B is connected to the first and second wires 41B and 42B by conductors 101B and 102B in the secondary circuit 82B. The supply circuit 100B is shown as a voltage divider circuit comprising resistor 108B and 109B to provide a voltage node 103B.

In this embodiment, the disconnect switch control circuit 85B is shown as a threshold conduction circuit 90B comprising a threshold conduction device 91B illustrated as a diode for alternating current (DIAC) 91B. A diode 109B is connected in series with the threshold conduction device 91B.

A threshold generating circuit 110B is similar to the circuit shown in FIG. 13. The diode 109B is connected in series with the capacitor 111B for enabling the capacitor 111B to accumulate any leakage current between either of the first and second wires 41B and 42B and the first and second shields 45B and 46B.

During a leakage current between either of the first and second wires 41B and 42B and the first and second shields 45B and 46B, the leakage current is accumulated and stored in the capacitor 111B until the charge in capacitor 111B is sufficient to actuate the diode for alternating current (DIAC) 91B and for providing sufficient current through solenoid coil 70B to open the disconnect switch 50B.

Figure 15:
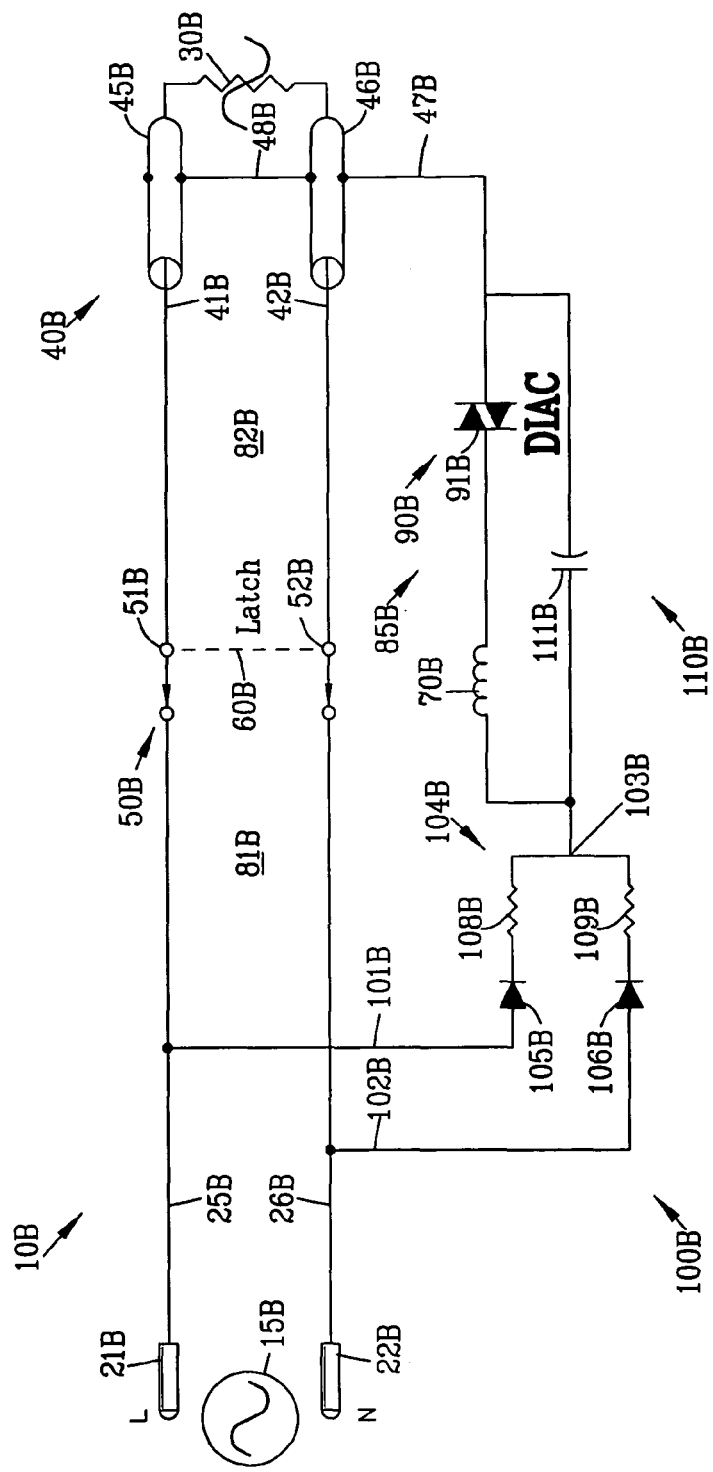
FIG. 15 is a second variation of the circuit diagram shown in FIG. 13.

FIG. 15 is a second variation of the circuit diagram shown in FIG. 13. In this example, a first and second shield 45B and 46B function as shield sensing conductors for sensing a leakage current between the one of the first and second wires 41B and 42B and the first and second shields 45B and 46B.

The supply circuit 100B is connected to the first and second wires 25B and 26B by conductors 101B and 102B in the primary circuit 81B. The supply circuit 100B is shown as a voltage divider circuit comprising diodes 105B and 106B and resistor 108B and 109B to provide a voltage node 103B.

In this embodiment, the disconnect switch control circuit 85B is shown as a threshold conduction circuit 90B comprising a threshold conduction device 91B illustrated as a diode for alternating current (DIAC) 91B.

A threshold generating circuit 110B is similar to the circuit shown in FIG. 13. During a leakage current between either of the first and second wires 41B and 42B and the first and second shields 45B and 46B, the leakage current is accumulated and stored in the capacitor 111B until the charge in capacitor 111B is sufficient to actuate the diode for alternating current (DIAC) 91B and for providing sufficient current through solenoid coil 70B to open the disconnect switch 50B.

Figure 16:
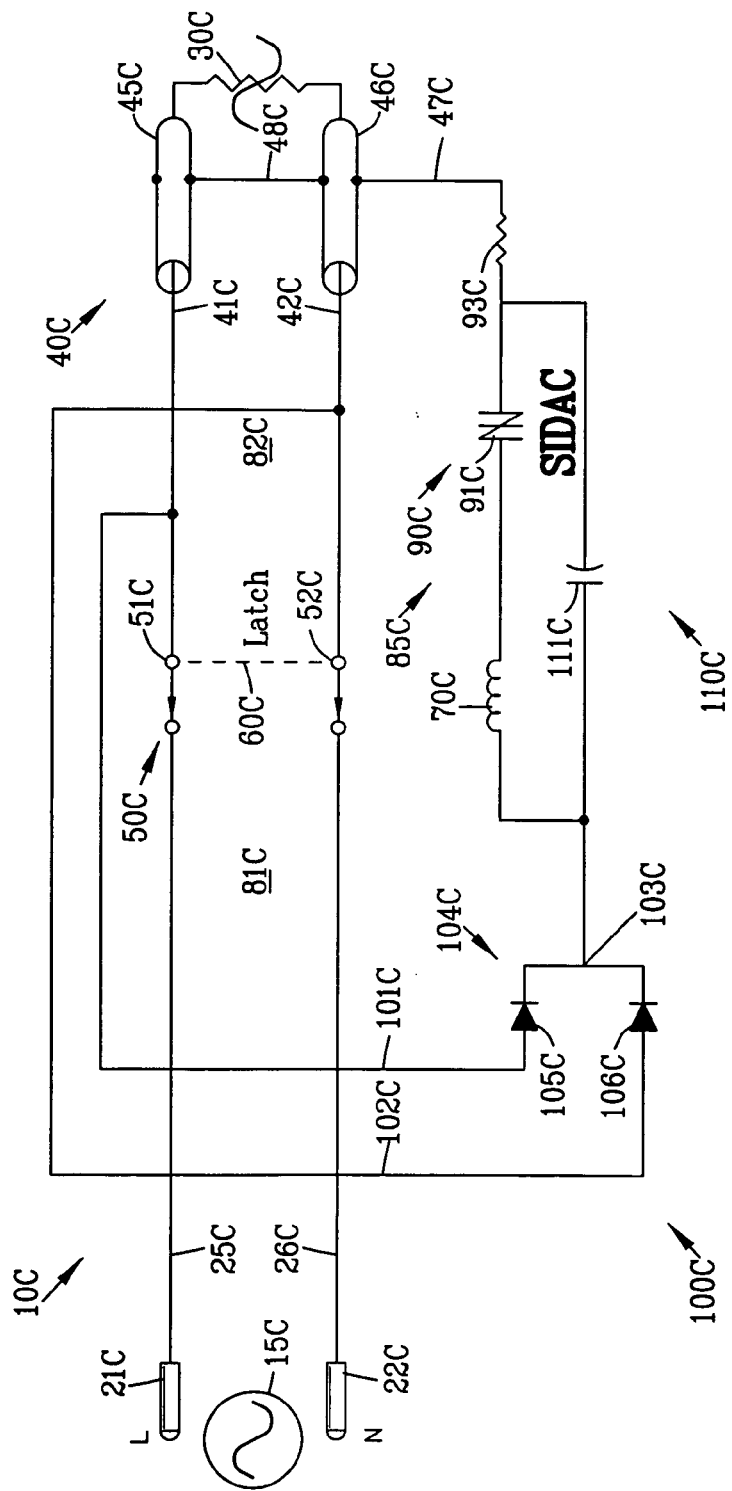
FIG. 16 is a circuit diagram of a fourth embodiment of a leakage detection and interruption circuit of the present invention.

FIG. 16 is a circuit diagram of a fourth embodiment of a leakage detection and interruption circuit 10C of the present invention. In this embodiment, similar components are labeled with similar numbers found in prior embodiments with a different alphabetical character.

In this example, a first and second shield 45C and 46C function as shield sensing conductors for sensing a leakage current between the one of the first and second wires 41C and 42C and the first and second shields 45C and 46C.

The supply circuit 100C is connected to the first and second wires 41C and 42C by conductors 101C and 102C in the secondary circuit 82C defined between the disconnect switch 50C and the load 30C to provide a node 103C. The supply circuit 100C is shown as a divider circuit 104C comprising diodes 105C and 106C to provide the node 103C.

The disconnect switch control circuit 85 is interposed between the shield 44C and the node 103C of the divider circuit 104C. In this embodiment, the disconnect switch control circuit 85C is shown as a threshold conduction circuit 90C comprising a threshold conduction device 91C. The threshold conduction device 91C is illustrated as a Silicon Diode For Alternating Current (SIDAC) 91C. The Silicon Diode For Alternating Current (SIDAC) 91C conducts upon a threshold voltage applied across the Silicon Diode For Alternating Current (SIDAC) 91C. An optional current limiting resistor 93C is connected in series with the threshold conduction device 91C.

A threshold generating circuit 110C is connected to the threshold conduction device 91C for actuating the threshold conduction device 91C upon a leakage current between the one of the first and second wires 41C and 42C and the first and second shields 45C and 46C. The threshold generating circuit 110C comprises a capacitor 111C.

In the event a leakage current develops between the first wires 41C and the first shield 45C, a leakage current will flow through diode 106C to charge capacitor 111C. When the voltage on capacitor 111C exceeds the threshold voltage of the Silicon Diode For Alternating Current (SIDAC) 91C, the Silicon Diode For Alternating Current (SIDAC) 91C conducts to discharge the capacitor 111C through the solenoid coil 70C to open the disconnect switch 50C.

In the event a leakage current develops between the second wires 41C and the second shield 46C, a leakage current will flow through diode 105C to charge capacitor 111C. When the voltage on capacitor 111C exceeds the threshold voltage of the Silicon Diode For Alternating Current (SIDAC) 91C, the Silicon Diode For Alternating Current (SIDAC) 91C conducts to discharge the capacitor 111C through the solenoid coil 70C to open the disconnect switch 50C.

During a leakage current between either of the first and second wires 41C and 42C and the first and second shields 45C and 46C, the leakage current is accumulated and stored in the capacitor 111C until the charge in capacitor 111C is sufficient to actuate the Silicon Diode For Alternating Current (SIDAC) 91C and for providing sufficient current through solenoid coil 70C to open the disconnect switch 50C.

Figure 17:
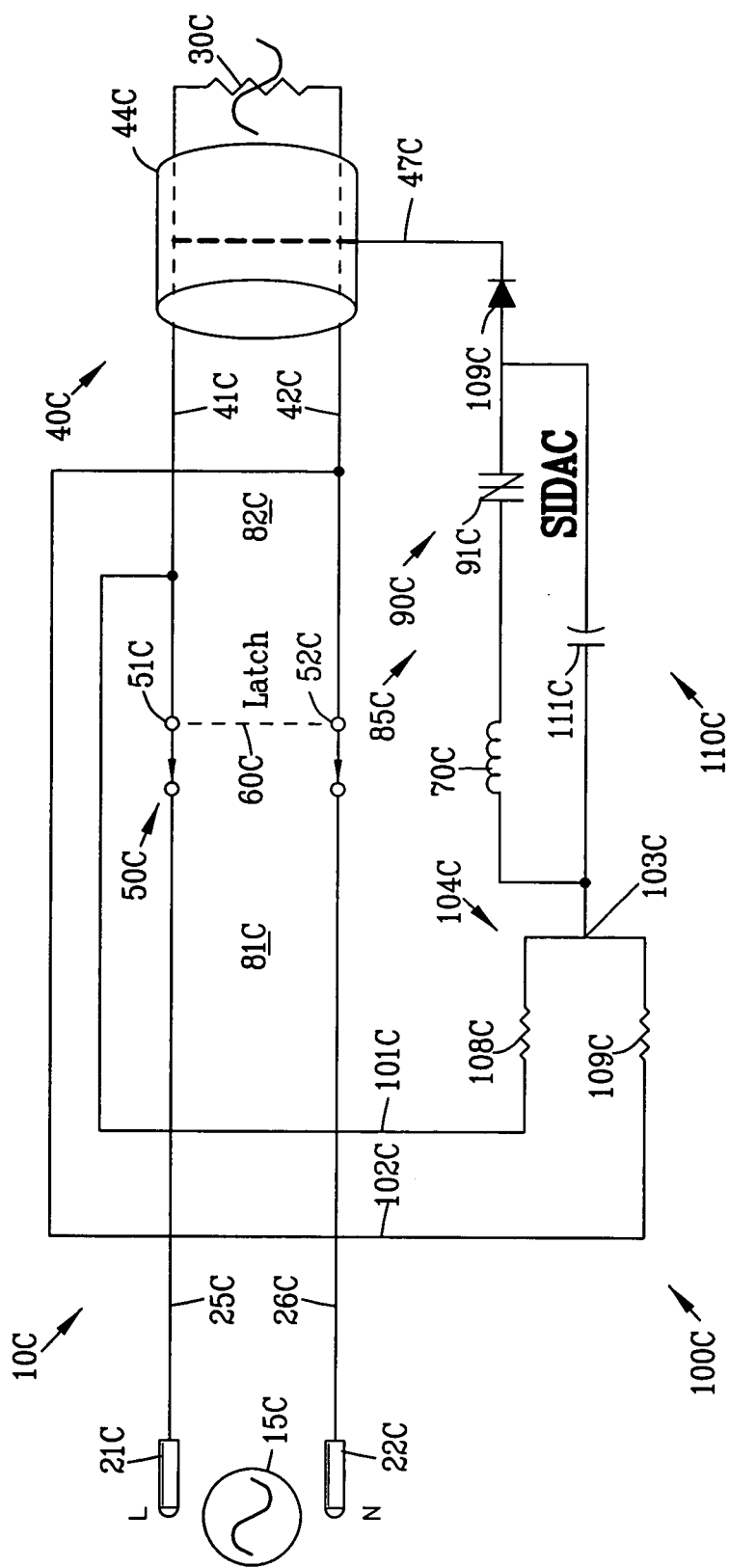
FIG. 17 is a first variation of the circuit diagram shown in FIG. 16.

FIG. 17 is a first variation of the circuit diagram shown in FIG. 16. In this example, a single shield 44C surrounding both the first and second wires 41C and 42C functions as shield sensing conductors for sensing a leakage current between the one of the first and second wires 41C and 42C and the shield 44C.

The supply circuit 100C is connected to the first and second wires 41C and 42C by conductors 101C and 102C in the secondary circuit 82C. The supply circuit 100C is shown as a voltage divider circuit comprising resistor 108C and 109C to provide a voltage node 103C.

In this embodiment, the disconnect switch control circuit 85C is shown as a threshold conduction circuit 90C comprising a threshold conduction device 91C illustrated as a Silicon Diode For Alternating Current (SIDAC) 91C. A diode 109C is connected in series with the threshold conduction device 91C.

A threshold generating circuit 110C is similar to the circuit shown in FIG. 13. The diode 109C is connected in series with the capacitor 111C for enabling the capacitor 111C to accumulate any leakage current between either of the first and second wires 41C and 42C and the first and second shields 45C and 46C.

During a leakage current between either of the first and second wires 41C and 42C and the shields 44C, the leakage current is accumulated and stored in the capacitor 111C until the charge in capacitor 111C is sufficient to actuate the Silicon Diode For Alternating Current (SIDAC) 91C and for providing sufficient current through solenoid coil 70C to open the disconnect switch 50C.

Figure 18:
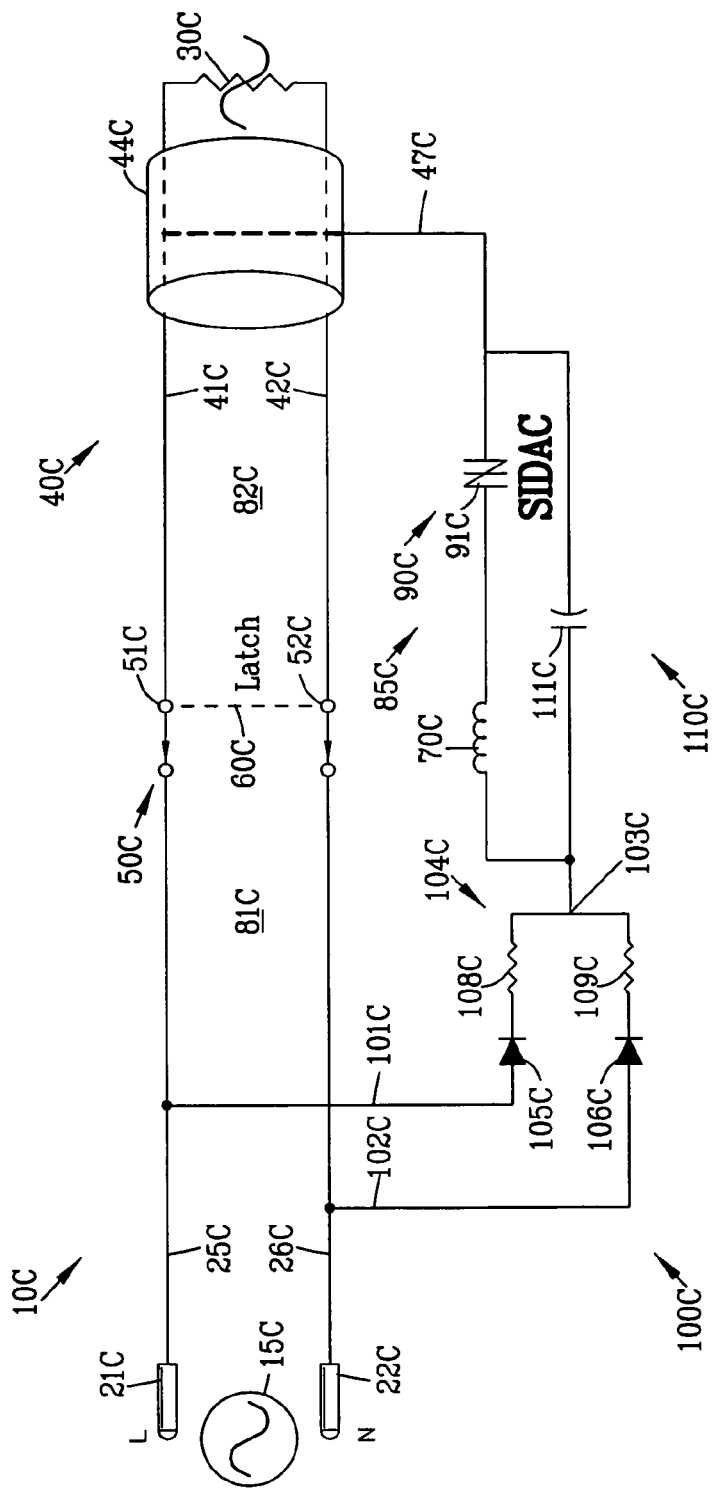
FIG. 18 is a second variation of the circuit diagram shown in FIG. 16.

FIG. 18 is a second variation of the circuit diagram shown in FIG. 16. In this example, a single shield 44C surrounding both the first and second wires 41C and 42C functions as shield sensing conductors for sensing a leakage current between the one of the first and second wires 41C and 42C and the shield 44C.

The supply circuit 100C is connected to the first and second wires 25C and 26C by conductors 101C and 102C in the secondary circuit 81C. The supply circuit 100C is shown as a voltage divider circuit comprising diodes 105C and 106C and resistor 108C and 109C to provide a voltage node 103C.

In this embodiment, the disconnect switch control circuit 85C is shown as a threshold conduction circuit 90C comprising a threshold conduction device 91C illustrated as a Silicon Diode For Alternating Current (SIDAC) 91C.

A threshold generating circuit 110C is similar to the circuit shown in FIG. 13. During a leakage current between either of the first and second wires 41C and 42C and the shield 44C, the leakage current is accumulated and stored in the capacitor 111C until the charge in capacitor 111C is sufficient to actuate the Silicon Diode For Alternating Current (SIDAC) 91C and for providing sufficient current through solenoid coil 70C to open the disconnect switch 50C.

Figure 19:
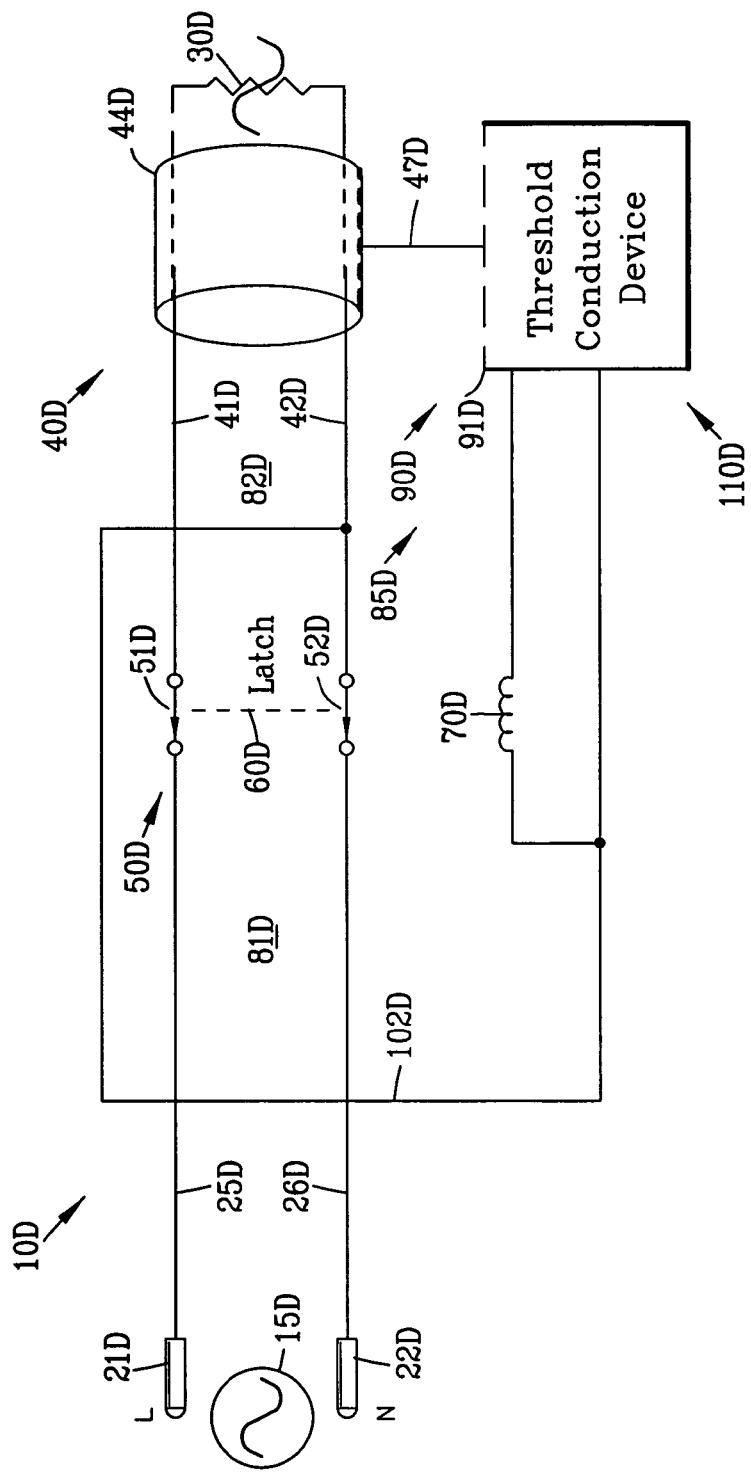
FIG. 19 is a block diagram of a fifth embodiment of a leakage detection and interruption circuit of the present invention.

FIG. 19 is a block diagram of a fifth embodiment of a leakage detection and interruption circuit 10D of the present invention. In this embodiment, similar components are labeled with similar numbers found in prior embodiments with a different alphabetical character. The circuit 10D disconnects the electrical power source 15D from the load 30D upon the detection of a leakage current within the wire assembly 40D.

In this example, a single shield 44D surrounding both the first and second wires 41D and 42D functions as shield sensing conductors for sensing a leakage current between the first wire 41D and the shield 44D. The second wire 42D is connected through conductor 102D in the secondary circuit 82D to the disconnect switch control circuit 85D.

The disconnect switch control circuit 85D is interposed between the shield 44D and the second wire 42D for controlling the disconnect switch 50D. The disconnect switch control circuit 85D opens the disconnect switch 50D upon a leakage current flow from the first wire 41D and the single shield 44D. The leakage detection and interruption circuit 10D does not open the disconnect switch 50D upon a leakage current flow from the second wire 42D and the single shield 44D.

The disconnect switch control circuit 85D is powered solely by a leakage current between the first wire 41 and the shield 44D. Essentially, no current flows through the disconnect switch control circuit 85 in the absence of any leakage current between the first wire 41 and the single shield 44D.

Figure 20:
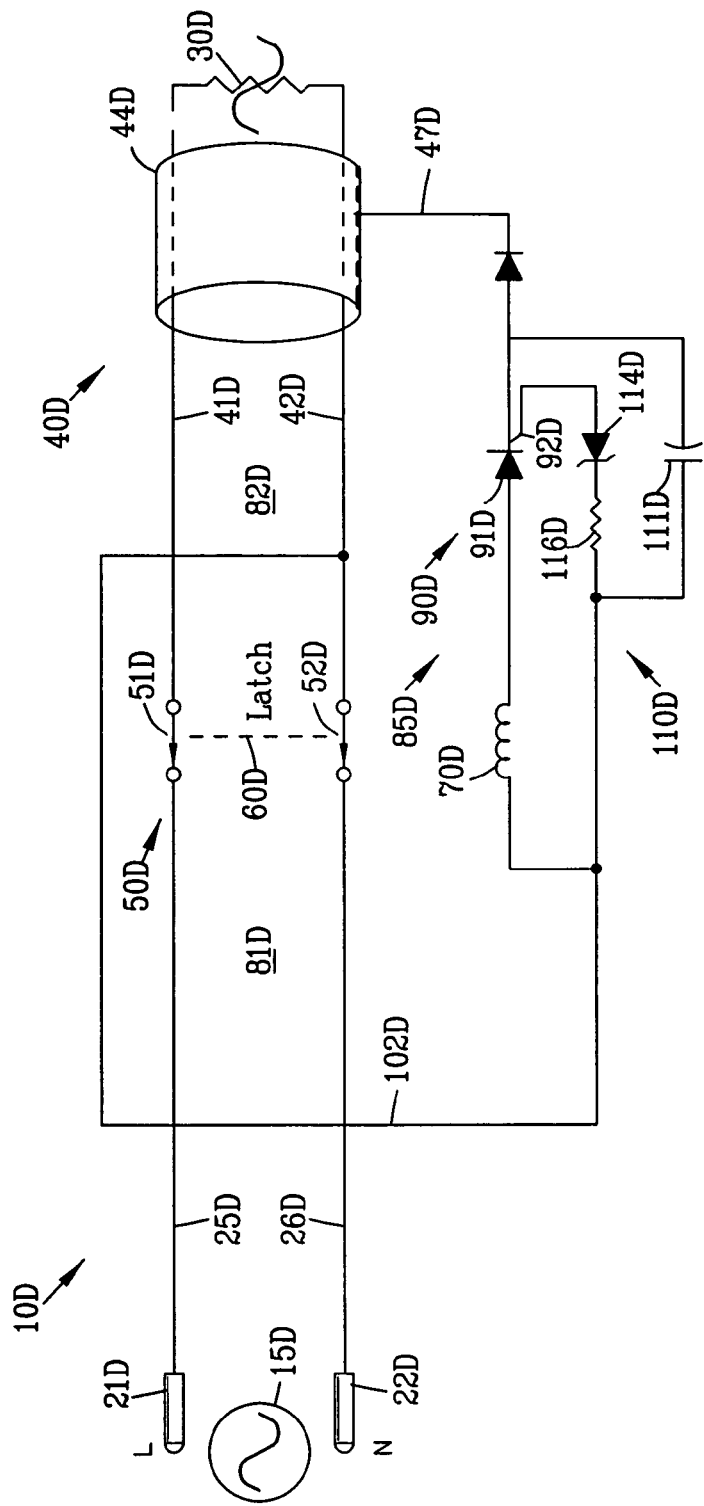
FIG. 20 is a circuit diagram of the fifth embodiment of the present invention shown in FIG. 19.

FIG. 20 is a circuit diagram of the fifth embodiment of the present invention shown in FIG. 19. In this example, a single shield 44D surrounding both the first and second wires 41D and 42D functions as shield sensing conductors for sensing a leakage current between the first wire 41D and the shield 44D.

The second wire 42D is connected through conductor 102D in the secondary circuit 82D to the disconnect switch control circuit 85D. The disconnect switch control circuit 85D is shown as a threshold conduction circuit 90D comprising a threshold conduction device 91D illustrated as a silicon control rectifier (SCR) having a gate 92D. A diode 109D is connected in series with the threshold conduction device 91D.

A threshold generating circuit 110D is similar to the circuit shown in FIG. 10. The diode 109D is connected in series with the capacitor 111D for enabling the capacitor 111D to accumulate any leakage current between either of the first wire 41D and the shield 44D.

In the event a leakage current develops between the first wires 41D and the single shield 44D, the leakage current will flow to charge capacitor 111D. When the voltage on capacitor 111D exceeds the breakdown voltage of the zener diode 114D, the zener diode 114D actuates the threshold conduction device 91D. Upon actuation of the threshold conduction device 91D, the capacitor 111D discharges through the solenoid coil 70D to open the disconnect switch 50D.

Figure 21:
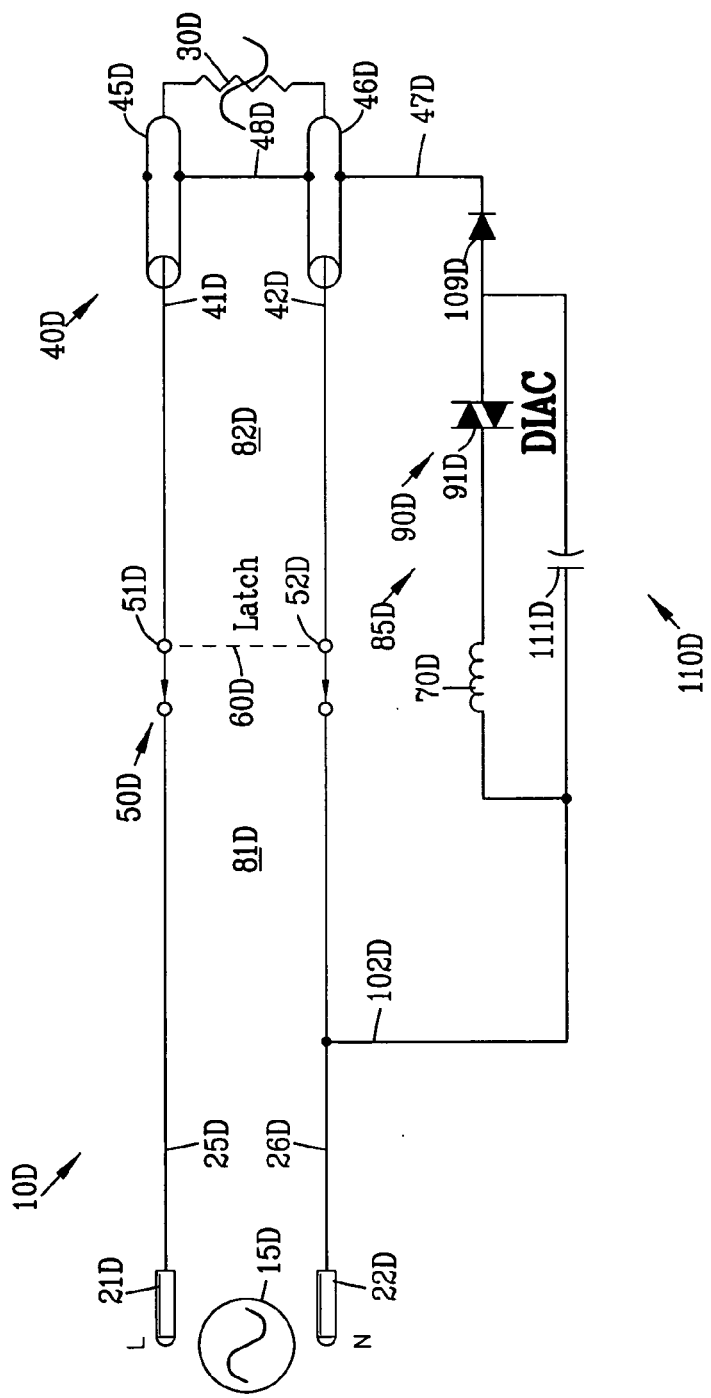
FIG. 21 is a first variation of the circuit diagram shown in FIG. 20.

FIG. 21 is a first variation of the circuit diagram shown in FIG. 20. In this embodiment, the disconnect switch control circuit 85D is shown as a threshold conduction circuit 90D comprising a threshold conduction device 91D. The threshold conduction device 91D is illustrated as a diode for alternating current (DIAC). The diode for alternating current (DIAC) 91D conducts upon a threshold voltage applied across the diode for alternating current (DIAC) 91D.

A threshold generating circuit 110D is connected to the threshold conduction device 91D for actuating the threshold conduction device 91D upon a leakage current between the first wire 41D and the first shield 45D. The threshold generating circuit 110D comprises a capacitor 111D.

In the event a leakage current develops between the first wires 41D and the first shield 45D, a leakage current will flow to charge capacitor 111D. When the voltage on capacitor 111D exceeds the threshold voltage of the diode for alternating current (DIAC) 91D, the diode for alternating current (DIAC) 91D conducts to discharged the capacitor 111D through the solenoid coil 70D to open the disconnect switch 50D.

Figure 22:
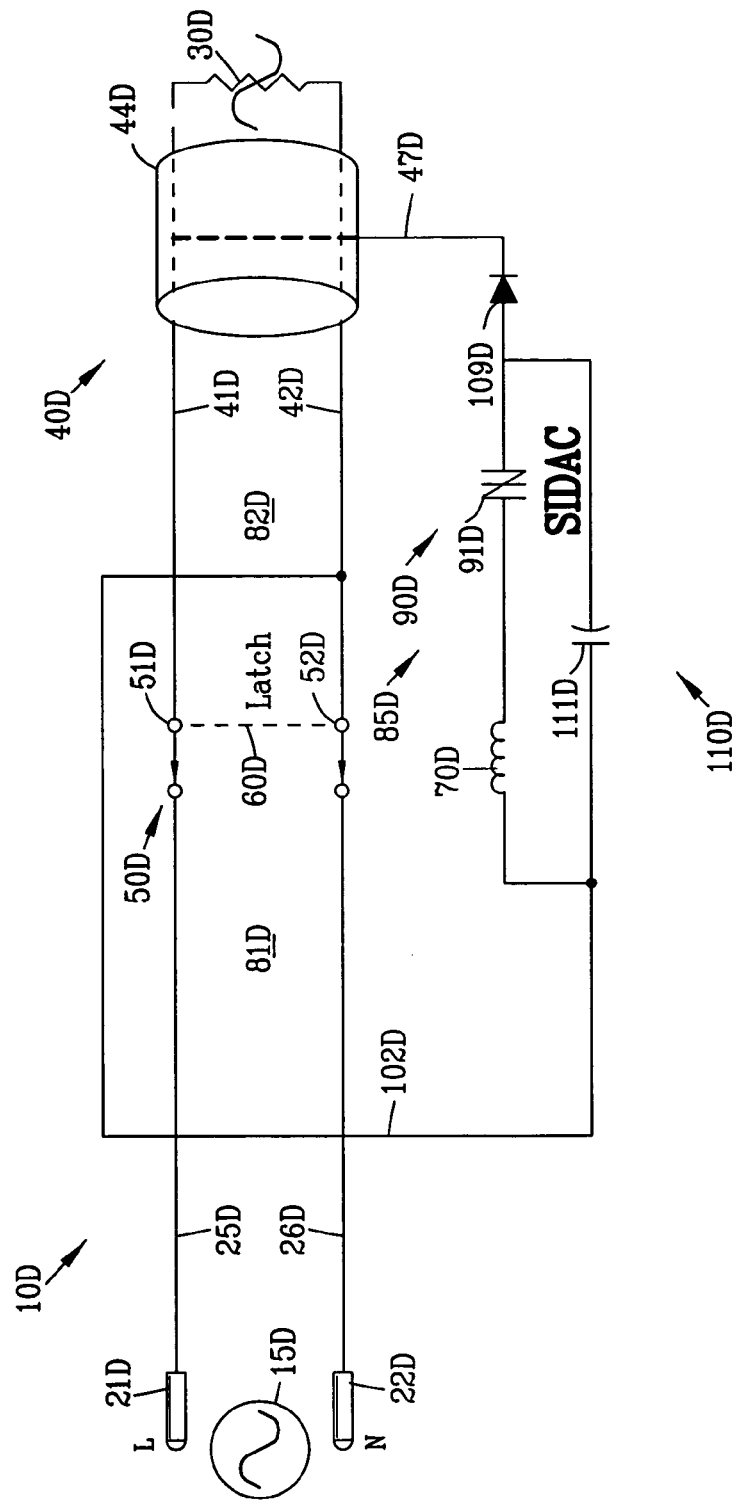
FIG. 22 is a second variation of the circuit diagram shown in FIG. 20.

FIG. 22 is a second variation of the circuit diagram shown in FIG. 20. In this embodiment, the disconnect switch control circuit 85D is shown as a threshold conduction circuit 90D comprising a threshold conduction device 91D illustrated as a Silicon Diode For Alternating Current (SIDAC) 91D. A diode 109D is connected in series with the threshold conduction device 91D.

A threshold generating circuit 110D is similar to the circuit shown in FIG. 21. The diode 109D is connected in series with the capacitor 111D for enabling the capacitor 111D to accumulate any leakage current between the first wire 41D and the first and shield 44D.

During a leakage current between the first wire 41D and the shield 44D, the leakage current is accumulated and stored in the capacitor 111D until the charge in capacitor 111D is sufficient to actuate the Silicon Diode For Alternating Current (SIDAC) 91D and for providing sufficient current through solenoid coil 70D to open the disconnect switch 50D.

Figure 23:
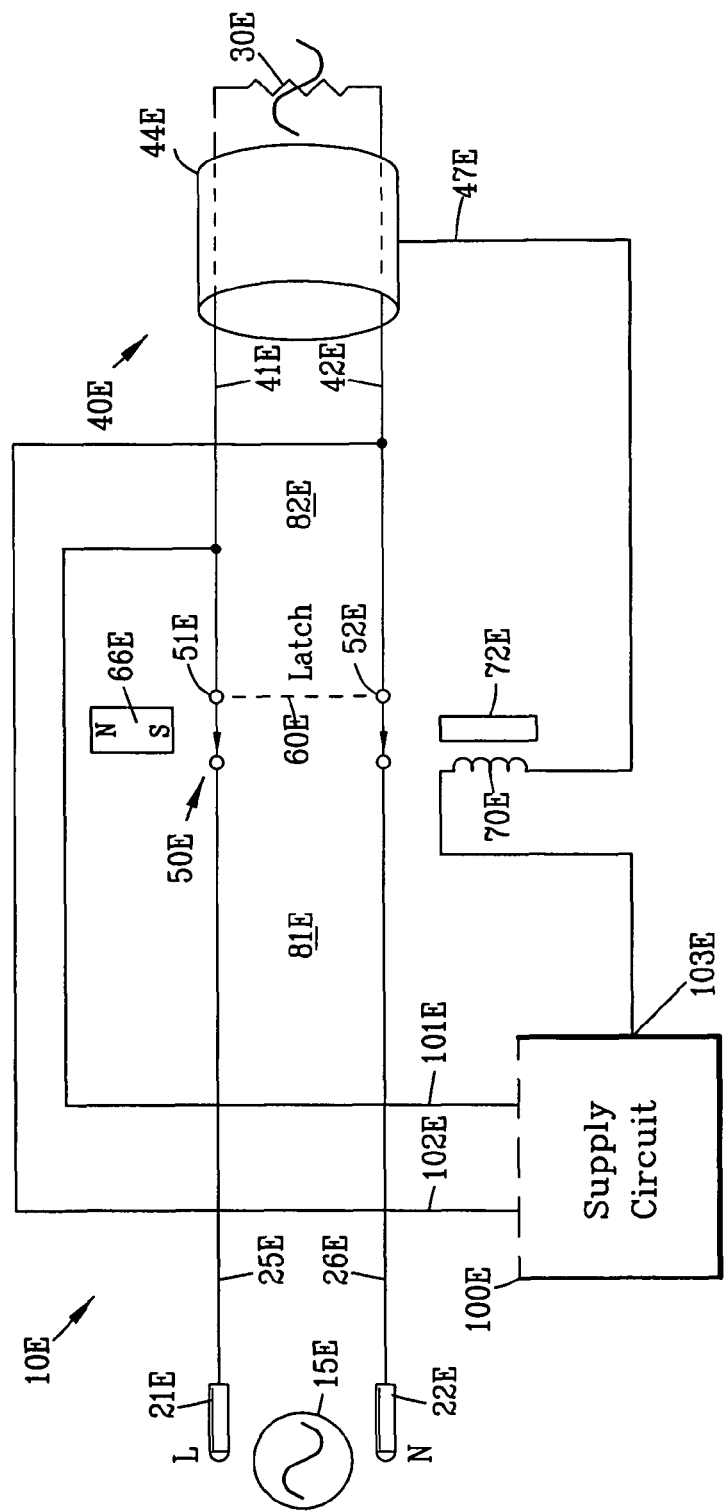
FIG. 23 is a block diagram of a sixth embodiment of a leakage detection and interruption circuit of the present invention.

FIG. 23 is a block diagram of a sixth embodiment of a leakage detection and interruption circuit of the present invention. In this embodiment, similar components are labeled with similar numbers in prior embodiments with a different alphabetical character. The circuit 10E disconnects the electrical power source 15E from the load 30E upon the detection of a leakage current within the wire assembly 40E. In this example, a single shield 44E surrounding both the first and second wires 41E and 42E functions as shield sensing conductors for sensing a leakage current between the one of the first and second wires 41E and 42E and the shield 44E.

In this example, the disconnect switch 50E incorporates a magnetic latch 60E comprising a permanent magnetic 66E. The permanent magnetic 66E cooperates with an armature 72E of the solenoid coil 70E to provide the magnetic latch 60E of the disconnect switch 50E.

The supply circuit 100E is connected to the first and second wires 41E and 42E through conductors 101E and 102E in the secondary circuit 82E defined between the disconnect switch 50E and the load 30E to provide a node 103E.

The supply circuit 100E is interposed between the single shield 44E and the first and second wires 41E and 42E for controlling the disconnect switch 50E. The supply circuit 100E opens the disconnect switch 50E upon a leakage current flow from one of the first and second wires 41E and 42E and the single shield 44E. The opening of the disconnect switch 50E is powered solely by a leakage current between either of the first and second wires 41E and 42E and the shield 44E. Essentially, no current flows through the supply circuit 100E in the absence of any leakage current between either of the first and second wires 41E and 42E and the shield 44E.

Figure 24:
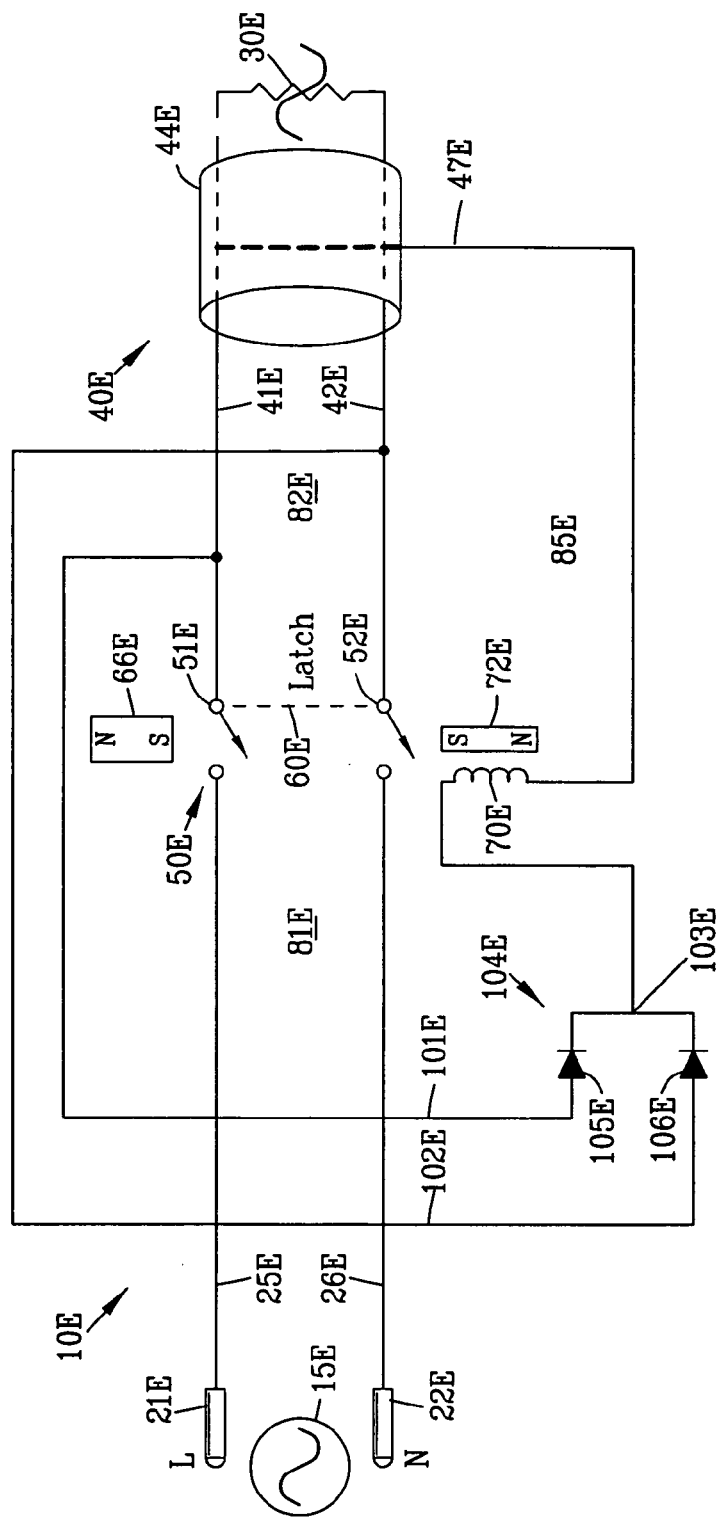
FIG. 24 is a circuit diagram of the sixth embodiment of the present invention shown in FIG. 23.

FIG. 24 is a circuit diagram of the sixth embodiment of the present invention shown in FIG. 23. The supply circuit 100E is connected to the first and second wires 41E and 42E by conductors 101E and 102E in the secondary circuit 82E defined between the disconnect switch 50E and the load 30E to provide a node 103E. The supply circuit 100E is shown as a divider circuit 104E comprising diodes 105E and 106E to provide the node 103E.

The disconnect switch control circuit 85E is interposed between the shield 44E and the node 103E of the divider circuit 104E. In this embodiment, the disconnect switch control circuit 85E is shown as a conductor 47E connecting the solenoid coil 70E to the shield 44E.

The switches 51E and 52E of the disconnect switch 50E are normally open position. The permanent magnetic 66E cooperates with the armature 72E of the solenoid coil 70E to provide the magnetic latch 60E to latch the disconnect switch 50E into a closed position as shown in FIG. 23.

In the event a leakage current develops between the first wire 41E and the shield 44E, a leakage current will flow from second wire 42E through diode 106E and through the armature 72E of the solenoid coil 70E to the shield 44E by way of the conductor 47E. The leakage current flow through solenoid coil 70E provides a magnetic field in the armature 72E as shown in FIG. 24. The magnetic field of the armature 72E opposes the magnetic field of the permanent magnetic 66E to release the magnetic latch 60E. The release the magnetic latch 60E enables the disconnect switch 50E into the normally open position as shown in FIG. 24 to disconnects the electrical power source 15E from the load 30E.

In the event a leakage current develops between the second wire 42E and the shield 44E, a leakage current will flow from the first wire 41E through diode 105E and through the armature 72E to the shield 44E by way of the conductor 47E. The leakage current flow through the solenoid coil 70E provides a magnetic field in the armature 72E as shown in FIG. 24. The magnetic field of the armature 72E opposes the magnetic field of the permanent magnetic 66E to release the magnetic latch 60E and to open the disconnect switch 50E as shown in FIG. 24.

It should be appreciated by those skilled in the art that either a single shield 44 or a first and a second shield 45 and 46 may be used for sensing a leakage current from the first and second wire 41 and 42. Furthermore, the supply circuit 100 may be connected to either the primary circuit 81 or the secondary circuit 82.

The disconnect switch 50 may be any type of appropriate switch for disconnecting the source 15 from the load 30 including electrical switches, electronic switches, electrical-mechanical switches, magnetic switches and the like.

It should be appreciated by those skilled in the art that threshold conduction device 91D may take various forms and should not be limited to a (SCR), (DIAC), (SIDAC) or a silicon unilateral switch (SUS). It should be appreciated further that the threshold generating circuit 110A may incorporate various forms of breakdown device and should not be limited to a zener diode.

An optional test circuit (not shown) may be included for testing the circuit. An example of test circuit suitable for use with the present invention is shown in U.S. Patent Publication 2007-0159740 to Williams et al. that is incorporated by reference as if full set forth herein.

The present invention has been shown in a preferred form employed within a circuit contained within a housing 20 fashioned in the form of an electrical plug. However, it should be understood that the present invention maybe applied to of various types of protection devices for protecting all types of electrical cords, electrical transmission lines and electrical circuits. Furthermore, the present invention has been shown with an air conditioning unit 32 as the load 30 but it should be understood that the circuit 10 of the present invention is suitable for use with a large variety of power sources and load as should be apparent to those skilled in the art.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A circuit for disconnecting a power source upon the detection of a leakage current from one of a first and a second wire connected to the power source, comprising:
    a sensing conductor located adjacent to one of the first and second wires for sensing a leakage current from one of the first and second wires;
    a disconnect switch interposed within the first and second wires connected to the power source;
    said disconnect switch having a disconnect switch solenoid coil for opening said disconnect switch;
    a threshold conduction device being conductive upon a threshold voltage applied to the threshold conduction device;
    a connector connecting said disconnect switch solenoid coil in series with said threshold conduction device between one of the first and second wires and said sensing conductor; and
    a threshold voltage generator comprising a capacitor connected in series with a diode between said sensing conductor and one of the first and second wires for charging said capacitor for generating said threshold voltage for said threshold conduction device upon a leakage current flow between said sensing conductor and one of the first and second wires and through said threshold voltage generator.

2. A circuit for disconnecting a power source upon the detection of a leakage current as set forth in claim 1, wherein said sensing conductor comprises a first and a second shield sensing conductor located about the first and second wires.

3. A circuit for disconnecting a power source upon the detection of a leakage current as set forth in claim 1, wherein said sensing conductor comprises a shield sensing conductor located about both of the first and second wires.

4. A circuit for disconnecting a power source upon the detection of a leakage current as set forth in claim 1, wherein said disconnect switch includes a normally open solenoid operated switch;
    a mechanical latch mechanism for maintaining said disconnect switch in a closed condition and
    said disconnect switch solenoid coil operating a plunger for disengaging said mechanical latch mechanism for opening said disconnect switch.

5. A circuit for disconnecting a power source upon the detection of a leakage current as set forth in claim 1, wherein said threshold conduction device includes a thyristor.

6. A circuit for disconnecting a power source upon the detection of a leakage current as set forth in claim 1, wherein said threshold conduction device includes a silicon, control rectifier (SCR).

7. A circuit for disconnecting a power source upon the detection of a leakage current as set forth in claim 1, wherein said threshold conduction device includes a silicon control rectifier (SCR) with a Zener diode connected to a gate of said silicon control rectifier (SCR).

8. A circuit for disconnecting a power source upon the detection of a leakage current as set forth in claim 1, wherein said threshold conduction device is a Diode For Alternating Current (DIAC).

9. A circuit for disconnecting a power source upon the detection of a leakage current as set forth in claim 1, wherein said threshold conduction device is a Silicon Diode For Alternating Current (SIDAC).

10. A circuit for disconnecting a power source upon the detection of a leakage current from one of a first and a second wire connected to the power source, comprising:
    a sensing conductor located adjacent to one of the first and second wires for sensing a leakage current from one of the first and second wires;
    a disconnect switch interposed within the first and second wires connected to the power source;
    said disconnect switch having a disconnect switch solenoid coil for opening said disconnect switch;
    a divider circuit interconnected between the first and second wires for providing a divider node;
    a threshold conduction device being conductive upon a threshold voltage applied to the threshold conduction device;
    a connector connecting said disconnect switch solenoid coil in series with said threshold conduction device between said divider node and said sensing conductor; and
    a capacitor connected between said divider node and said sensing conductor to provide said threshold voltage to said threshold conduction device upon a leakage current flow between said sensing conductor and one of the first and second wires.

11. A circuit for disconnecting a power source upon the detection of a leakage current as set forth in claim 10, wherein said divider circuit includes a diode divider circuit.

12. A circuit for disconnecting a power source upon the detection of a leakage current as set forth in claim 11, wherein said divider circuit includes a resistive divider circuit.

13. A circuit for disconnecting a power source upon the detection of a leakage current as set forth in claim 10, wherein said divider circuit provides a voltage node.

14. A circuit for disconnecting a power source upon the detection of a leakage current as set forth in claim 10, wherein said capacitor is connected between said divider node and said sensing conductor and in parallel with said threshold conduction device.

15. A circuit for disconnecting a power source upon the detection of a leakage current as set forth in claim 10, wherein said threshold conduction device includes a silicon control rectifier (SCR).

16. A circuit for disconnecting a power source upon the detection of a leakage current as set forth in claim 10, wherein said threshold conduction device is a Diode For Alternating Current (DIAC).

17. A circuit for disconnecting a power source upon the detection of a leakage current as set forth in claim 10, wherein said threshold conduction device is a Silicon Diode For Alternating Current (SIDAC).

18. A circuit for disconnecting a power source upon the detection of a leakage current as set forth in claim 10, wherein said threshold conduction device comprises a thyristor connected in series with said disconnect switch solenoid coil between and said divider node and said sensing conductor; and
- a breakdown voltage conduction device connected for actuating said thyristor upon said capacitor providing a breakdown voltage to said breakdown voltage conduction device.

19. A circuit for disconnecting a power source upon the detection of a leakage current as set forth in claim 10, wherein said threshold conduction device comprises a thyristor connected in series with said disconnect switch solenoid coil and said divider node and said sensing conductor; and
- a Zener diode connected to a gate of said thyristor for actuating said thyristor upon said capacitor providing a breakdown voltage to said Zener diode.

20. A circuit for disconnecting a power source upon the detection of a leakage current from one of a first and a second wire connected to the power source, comprising:
- a sensing conductor located adjacent to one of the first and second wires for sensing a leakage current from one of the first and second wires;
- a disconnect switch interposed within the first and second wires connected to the power source;
- said disconnect switch having a disconnect switch solenoid coil for opening said disconnect switch;
- a threshold conduction device being conductive upon a threshold voltage applied to the threshold conduction device;
- a connector connecting said disconnect switch solenoid coil in series with said threshold conduction device between said divider node and said sensing conductor; and
- a capacitor connected between said sensing conductor and one of the first and second wires for charging said capacitor with a leakage current flow between said sensing conductor and one of the first and second wires to provide said threshold voltage generator to said threshold conduction device.

21. A circuit for disconnecting a power source upon the detection of a leakage current from a wire connected to the power source, comprising:
- a sensing conductor located adjacent to the wire for sensing a leakage current from the wire;
- a disconnect switch interposed within the wire connected to the power source; and
- a disconnect switch control circuit comprising a capacitor connected to said sensing conductor for opening said disconnect switch upon said capacitor accumulating a predetermined amount of the leakage current from said sensing conductor.

* * * * *